United States Patent
Wang et al.

(10) Patent No.: US 11,197,281 B2
(45) Date of Patent: Dec. 7, 2021

(54) CONTROL INFORMATION TRANSMISSION METHOD AND APPARATUS

(71) Applicant: HUAWEI TECHNOLOGIES CO., LTD, Shenzhen (CN)

(72) Inventors: Jian Wang, Hangzhou (CN); Jun Wang, Hangzhou (CN); Rong Li, Hangzhou (CN); Huazi Zhang, Hangzhou (CN); Chaolong Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/503,607

(22) Filed: Jul. 4, 2019

(65) Prior Publication Data

US 2019/0335431 A1    Oct. 31, 2019

Related U.S. Application Data

(63) Continuation of application No. PCT/CN2018/071269, filed on Jan. 4, 2018.

(30) Foreign Application Priority Data

Jan. 5, 2017    (CN) .......................... 201710008203.9

(51) Int. Cl.
*H04L 1/00*    (2006.01)
*H04W 72/04*    (2009.01)

(52) U.S. Cl.
CPC ......... *H04W 72/042* (2013.01); *H04L 1/0057* (2013.01)

(58) Field of Classification Search
CPC ......... H04W 72/0406; H04W 72/0413; H04W 72/042; H04L 1/0057
See application file for complete search history.

(56) References Cited

U.S. PATENT DOCUMENTS

2013/0195047 A1    8/2013 Koivisto et al.
2014/0365842 A1    12/2014 Li et al.
(Continued)

FOREIGN PATENT DOCUMENTS

| CN | 103220001 A | 7/2013 |
|---|---|---|
| CN | 103516476 A | 1/2014 |
| EP | 3497836 A1 | 6/2019 |

OTHER PUBLICATIONS

Huawei et al.: "Evaluation of channel coding schemes for control channel",3GPP Draft; R1-1608863 Evaluation of Channel Coding Schemes for Controlchannel, 3rd Generation Partnership Project (3GPP), Mobile Competence Centre650, Route Des Lucioles ; F-06921 Sophia-Anti Polivol. Ran WGI, no. Lisbon,Oct. 10, 2016-Oct. 14, 2016 Oct. 9, 2016 (Oct. 9, 2016), XP051148917,total 10 pages.

(Continued)

*Primary Examiner* — Kent Krueger

(74) *Attorney, Agent, or Firm* — Hauptman Ham, LLP

(57) ABSTRACT

Embodiments of the present invention provide a control information transmission method and apparatus. The control information transmission method includes: determining, by a network device, N pieces of to-be-jointly-coded downlink control information DCI, where N is an integer greater than or equal to 2; coding, by the network device, the N pieces of DCI in a polar coding manner, to obtain one codeword; and mapping, by the network device, the codeword to a time-frequency resource of a downlink control channel for sending. According to the embodiments of the present invention, not only a relatively high coding gain can be obtained, but a relatively low average processing latency on a decoder side can also be obtained.

13 Claims, 12 Drawing Sheets

(56) References Cited

U.S. PATENT DOCUMENTS

| | | | |
|---|---|---|---|
| 2015/0103947 A1 | 4/2015 | Shen et al. | |
| 2016/0182187 A1* | 6/2016 | Kim | H04L 1/1861 714/807 |
| 2018/0167932 A1* | 6/2018 | Papasakellariou | H04L 5/0053 |
| 2019/0140784 A1* | 5/2019 | Xi | H04L 1/1845 |
| 2019/0190655 A1* | 6/2019 | Pan | H04L 1/0072 |
| 2020/0076535 A1* | 3/2020 | Xu | H04L 1/0057 |

OTHER PUBLICATIONS

Intel Corporation: "on the DCI design formulti-subframe scheduling",3GPP Draft; R1-164127, 3rd Generationpartnership Project (3GPP), Moble Competence Centre ; 650, Route Desluci Oles ; F-06921 Sophia-Anti Polis Cedex; France,vol. RAN WGI, no. Nanjing, China; May 23, 2016-May 27, 2016 May 14, 2016 (May 14, 2016), XP051090089,total 6 pages.

Guo Jianfeng et al.: "Multi-CRCCodes and Their Applications",IEEE Communications Letters, IEEE Service Center, Piscataway, NJ, US,vo 1 • 20, No. 2 ,Feb. 1, 2016 (Feb. 1, 2016 ),pp. 212-215, XP011598246, total 4 pages.

MediaTek Inc.,"Comparison of coding candidates for DL control channels and extended applications",3GPP TSG RAN WG1 Meeting #87 R1-1613061,Reno, USA, Nov. 14-18, 2016,total 6 pages.

Intel Corporation,"Discussion on Control channel coding for NR",3GPP TSG RAN WG1 Meeting #87 R1-1612587, Reno Nevada, November Nov. 14-18, 2016,total 4 pages.

MediaTek Inc.,"Comparison of coding candidates for DL control channels and extended applications",3GPP TSG RAN WG1 Meeting #87 R1-1612135,Reno, USA, Nov. 14-18, 2016,total 5 pages.

Zte et al.,"Way Forward on Ack/Nack feedback of DL HARQ for NR",3GPP TSG RAN WG1 #86 R1-167979, Gothenburg, Sweden Aug. 22-26, 2016,total 4 pages.

Ido Tal,"List Decoding of Polar Codes",IEEE Transactions on Information Theory, vol. 61, No. 5, May 2015,total 14 pages.

Erdal Arikan,"Channel Polarization: A Method for Constructing Capacity-Achieving Codes for Symmetric Binary-Input Memoryless Channels",IEEE Transactions On Information Theory, vol. 55, No. 7, Jul. 2009,total 23 pages.

\* cited by examiner ial Application No.
CONTROL INFORMATION TRANSMISSION METHOD AND APPARATUS

CROSS-REFERENCE TO RELATED APPLICATIONS

This application is a continuation of International Application No. PCT/CN2018/071269, filed on Jan. 4, 2018, which claims priority to Chinese Patent Application No. 201710008203.9, filed on Jan. 5, 2017. The disclosures of the aforementioned patent applications are hereby incorporated by reference in their entireties.

TECHNICAL FIELD

The present invention relates to the field of communications technologies, and in particular, to a control information transmission method and apparatus.

BACKGROUND

In a long term evolution (Long Term Evolution, LTE) system, control information mainly includes downlink control information (downlink control information, DCI) and uplink control information (uplink control information, UCI). The control information carries a function of scheduling an entire communications system, and reliability and coverage of the control information directly affect reliability and coverage of the entire system.

Compared with data information, the control information usually has a shorter length. For example, a length of DCI in the LTE is usually ten-plus to seventy-plus bits. The DCI also has a relatively short code length after being coded. For example, in the LTE, coded DCI has four lengths: 72 bits, 144 bits, 288 bits, and 576 bits. In other words, a maximum length is 576 bits.

In the LTE system, after coding and modulating the DCI, a base station maps the DCI to a downlink control channel and sends the downlink control channel to user equipment (User Equipment, UE). The downlink control channel is usually located in first one to three orthogonal frequency division multiplexing (Orthogonal Frequency Division Multiplexing, OFDM) symbols of each subframe.

As shown in FIG. 1, in the LTE system, a plurality of pieces of DCI delivered by the base station in a same subframe are modulated and mapped after being separately coded. A code rate of the DCI is determined by the base station based on a channel condition of a user, and there are four aggregation levels of time-frequency resources used for carrying a physical downlink control channel (Physical Downlink Control Channel, PDCCH). The four aggregation levels respectively correspond to a code length of 72 bits, a code length of 144 bits, a code length of 288 bits, and a code length of 576 bits. Given a length of the DCI, the base station may send the DCI to UE in a better channel condition through a PDCCH corresponding to a lower aggregation level (for example, a code length is 72 bits or 144 bits), and send the DCI to UE in a poorer channel condition through a PDCCH corresponding to a higher aggregation level (for example, a code length is 288 bits or 576 bits).

SUMMARY

Embodiments of the present invention provide a control information transmission method and apparatus, so that not only a relatively high coding gain can be obtained, but a relatively low average processing latency on a decoder side can be obtained.

A first aspect provides a control information transmission method, and the control information transmission method may be performed by a network device. Optionally, the network device determines N pieces of to-be-jointly-coded downlink control information DCI, where N is an integer greater than or equal to 2. The network device cascades and sorts the N pieces of DCI, and jointly codes the cascaded and sorted N pieces of DCI in a polar coding manner, to obtain one codeword.

The network device maps the codeword to a time-frequency resource of a downlink control channel for sending. Optionally, the network device may map the codeword to the time-frequency resource of the downlink control channel according to a preset channel resource mapping rule. When the N pieces of DCI are jointly coded in this manner, a relatively high coding gain can be obtained, and sequential polar code decoding is performed on a decoder side, so that a relatively low average processing latency on the decoder side is obtained.

In a possible design, each of the N pieces of DCI includes a cyclic redundancy check (Cyclic Redundancy Check, CRC) code, and the CRC may be formed by performing scrambling by using a preset identifier corresponding to user equipment of the DCI.

In a possible design, when jointly coding the N pieces of DCI in the polar coding manner, the network device first cascades the N pieces of DCI in a preset order, and then jointly codes the cascaded N pieces of DCI in the polar coding manner, to obtain one codeword.

In a possible design, the preset order may include at least one of the following orders: DCI of user equipment with a high priority ranks higher than DCI of user equipment with a low priority; DCI of user equipment in a good channel condition ranks higher than DCI of user equipment in a poor channel condition; and DCI of latency-sensitive user equipment ranks higher than DCI of latency-insensitive user equipment.

In a possible design, a manner in which the network device determines the N pieces of to-be-jointly-coded DCI may be: The network device determines the N pieces of to-be-jointly-coded DCI according to a preset rule, where the preset rule may be at least one of the following rules: one rule may be that user equipments of the N pieces of DCI are in same or similar channel conditions, in other words, DCI of user equipments that are in same or similar channel conditions is coded together into one codeword, and being in similar channel conditions may be that a difference between channel parameters of the user equipments of the N pieces of DCI is within a specific threshold; and another rule may be that functions indicated by information carried in the N pieces of DCI are the same, for example, all the functions indicated by the information carried in the N pieces of DCI are uplink data channel scheduling.

In a possible design, a time-frequency resource of the downlink control channel in one time interval carries one codeword, in other words, an entire downlink control channel area in one time interval is used to carry one codeword.

Alternatively, a time-frequency resource of the downlink control channel in one time interval carries M codewords, and user equipment of DCI included in any one of the M codewords is in same or similar channel conditions, where M is an integer greater than or equal to 2.

A second aspect provides a control information transmission method, and the control information transmission method may be performed by user equipment. Optionally, when receiving information sent by a network device, the user equipment obtains to-be-decoded information that includes DCI of the user equipment from the information. Optionally, the user equipment may obtain the to-be-decoded information that includes the DCI of the user equipment from the information according to a preset channel resource mapping rule. The to-be-decoded information carries a codeword obtained by the network device by jointly coding N pieces of DCI in a polar coding manner, where N is an integer greater than or equal to 2.

The user equipment sequentially decodes the to-be-decoded information, to obtain the DCI of the user equipment from the to-be-decoded information. Further optionally, after obtaining the DCI of the user equipment through decoding, the user equipment stops decoding, and performs a corresponding operation based on the DCI of the user equipment.

In a possible design, the DCI of the user equipment includes a cyclic redundancy check (Cyclic Redundancy Check, CRC) code formed by performing scrambling by using a preset identifier corresponding to the user equipment, and when the user equipment sequentially decodes the to-be-decoded information, each time one piece of DCI is decoded, the user equipment descrambles a CRC in the DCI by using the preset identifier corresponding to the user equipment.

Then, the user equipment checks an information part of the DCI by using a descrambled CRC, to be specific, determines whether the DCI is the DCI of the user equipment. If the check succeeds, the DCI is the DCI of the user equipment.

In a possible design, the preset identifier corresponding to the user equipment includes a unique identifier pre-allocated to the user equipment, for example, a unique identifier is allocated to the user equipment based on a function of the DCI. Alternatively, the preset identifier corresponding to the user equipment is a group identifier that is pre-allocated to a group in which the user equipment is located.

A third aspect provides a feedback information transmission method, the feedback information transmission method is performed by a first device, and the first device may be user equipment or a network device. Optionally, the first device determines Q pieces of feedback information, where the Q pieces of feedback information are feedbacks for data that is carried by P data transmission units and received by the first device, Q is an integer greater than or equal to 2, P is greater than or equal to Q, and P is an integer.

The first device jointly codes the Q pieces of feedback information in a polar coding manner, to obtain one codeword, and then maps the codeword to a corresponding time-frequency resource for sending.

In a possible design, if the first device is a network device, the data carried by the P data transmission units is data sent by at least one user equipment to the network device, and the at least one user equipment is in same or similar channel conditions. In other words, the network device codes, into one codeword for feedback, feedback information of the at least one user equipment in same or similar channel conditions for data sent by the network device.

If the first device is user equipment, the data carried by the P data transmission units is data sent by a network device to the user equipment.

In a possible design, a coding manner in which the first device jointly codes the Q pieces of feedback information in the polar coding manner may be: The first device divides the Q pieces of feedback information into R information segments by using K pieces of feedback information as a basic unit, where K is an integer greater than or equal to 2, and K×R is greater than or equal to Q.

The first device adds a CRC after each information segment, and jointly codes R information segments to which the CRC is added, to obtain one codeword.

In a possible design, the data transmission unit may be a basic unit for transmitting data. For example, the data transmission unit may include a code block (code block, CB), and one piece of feedback information may correspond to at least one CB. For example, one piece of feedback information may be used to feed back data transmitted by two consecutive CBs.

Alternatively, the data transmission unit may be a basic carrying unit that carries transmitted data. For example, the data transmission unit may include a component carrier (component carrier, CC), the CC is used to carry a transmission block (transmission block, TB), and one piece of feedback information corresponds to one CC.

A fourth aspect provides a feedback information transmission method, and the feedback information transmission method is performed by a second device. The second device may be user equipment or a network device. If a first device is user equipment, the second device is a network device, and if the first device is a network device, the second device is user equipment.

Optionally, when the second device receives information fed back by the first device, the second device obtains to-be-decoded information from the information, where the to-be-decoded information carries a codeword obtained by the first device by jointly coding Q pieces of feedback information in a polar coding manner, and Q is an integer greater than or equal to 2.

The second device performs sequential polar code decoding on the to-be-decoded information, to obtain the Q pieces of feedback information. Optionally, when the second device decodes feedback information indicating that retransmission needs to be performed, the second device retransmits corresponding data.

In a possible design, the codeword carried in the to-be-decoded information includes R information segments, the R information segments are obtained by dividing the Q pieces of feedback information by using K pieces of feedback information as a basic unit, and each information segment includes one CRC.

When sequentially decoding the to-be-decoded information, the second device performs sequential polar code decoding on the to-be-decoded information in a form of consecutive information segments, and each time one information segment is decoded, the network device checks the information segment by using a CRC of the information segment. If the check succeeds, the second device determines, based on feedback information of the information segment, whether to retransmit data.

A fifth aspect provides a control information transmission apparatus, applied to a network device, and the control information transmission apparatus includes a determining unit, a coding unit, and a mapping unit. The determining unit is configured to determine N pieces of to-be-jointly-coded downlink control information DCI, where N is an integer greater than or equal to 2. The coding unit is configured to jointly code the N pieces of DCI in a polar coding manner, to obtain one codeword. The mapping unit is configured to map the codeword to a time-frequency resource of a downlink control channel for sending. Optionally, the mapping unit may map, according to a preset channel resource mapping rule, the codeword to the time-frequency resource of the downlink control channel for sending.

A sixth aspect provides a control information transmission apparatus, applied to user equipment, and the control information transmission apparatus includes an obtaining unit and a decoding unit. The obtaining unit is configured to: when information sent by a network device is received, obtain to-be-decoded information that includes DCI of the user equipment from the information, where the to-be-decoded information carries a codeword obtained by the network device by jointly coding N pieces of DCI in a polar coding manner, and N is an integer greater than or equal to 2. The decoding unit is configured to perform sequential polar code decoding on the to-be-decoded information, to obtain the DCI of the user equipment.

A seventh aspect provides a feedback information transmission apparatus, applied to a first device, and the feedback information transmission apparatus includes a determining unit, a coding unit, and a mapping unit. The determining unit is configured to determine Q pieces of feedback information, where the Q pieces of feedback information are feedbacks for received data carried by P data transmission units, Q is an integer greater than or equal to 2, P is greater than or equal to Q, and P is an integer. The coding unit is configured to jointly code the Q pieces of feedback information in a polar coding manner, to obtain one codeword. The mapping unit is configured to map the codeword to a corresponding time-frequency resource for sending.

An eighth aspect provides a feedback information transmission apparatus, applied to a second device, and the feedback information transmission apparatus includes an obtaining unit and a decoding unit. The obtaining unit is configured to: when information fed back by a first device is received, obtain to-be-decoded information from the information, where the to-be-decoded information carries a codeword obtained by the first device by jointly coding Q pieces of feedback information in a polar coding manner, and Q is an integer greater than or equal to 2. The decoding unit is configured to perform sequential polar code decoding on the to-be-decoded information, to obtain the Q pieces of feedback information.

A ninth aspect provides a control information transmission apparatus, applied to a network device, and the control information transmission apparatus includes a transceiver, a processor, and a memory. The control information transmission apparatus is a specific structure that carries function modules in the fifth aspect.

The memory is configured to store a computer program instruction.

The processor is coupled to the memory, and is configured to read the computer program instruction stored in the memory and perform the method provided in the first aspect.

A tenth aspect provides a control information transmission apparatus, applied to user equipment, and the control information transmission apparatus includes a transceiver, a processor, and a memory. The control information transmission apparatus is a specific structure that carries function modules in the sixth aspect.

The memory is configured to store a computer program instruction.

The processor is coupled to the memory, and is configured to read the computer program instruction stored in the memory and perform the method provided in the second aspect.

An eleventh aspect provides a feedback information transmission apparatus, applied to a first device, and the feedback information transmission apparatus includes a transceiver, a processor, and a memory. The feedback information transmission apparatus is a specific structure that carries function modules in the seventh aspect.

The memory is configured to store a computer program instruction.

The processor is coupled to the memory, and is configured to read the computer program instruction stored in the memory and perform the method provided in the third aspect.

A twelfth aspect provides a feedback information transmission apparatus, applied to a second device, and the feedback information transmission apparatus includes a transceiver, a processor, and a memory. The feedback information transmission apparatus is a specific structure that carries function modules in the eighth aspect.

The memory is configured to store a computer program instruction.

The processor is coupled to the memory, and is configured to read the computer program instruction stored in the memory and perform the method provided in the fourth aspect.

In the embodiments of the present invention, when transmitting DCI, the network device determines the N pieces of to-be-jointly-coded DCI, and jointly codes the N pieces of DCI in the polar coding manner, to obtain one codeword. In this joint coding manner, a relatively high channel coding gain can be obtained, and DCI transmission reliability can be improved. In addition, because the polar coding manner is used, the user equipment can quickly obtain the DCI of the user equipment through sequential decoding, and perform a corresponding operation. In this way, a relatively low average processing latency of the user equipment is obtained.

DESCRIPTION OF DRAWINGS

To describe the technical solutions in the embodiments of the present invention more clearly, the following briefly describes the accompanying drawings required for the embodiments.

DESCRIPTION OF EMBODIMENTS

The following describes the embodiments of the present invention with reference to the accompanying drawings.

A control information transmission method in the embodiments of the present invention may be applied to DCI transmission in 5th generation (the 5th Generation, 5G) mobile communications New Radio (New Radio, NR).

A feedback information transmission method in the embodiments of the present invention may be applied to acknowledgement (Acknowledgement, ACK)/negative acknowledgement (Negative Acknowledgement, NACK) feedback information transmission in the 5G New Radio.

A network device in the embodiments of the present invention is mainly responsible for functions on an air interface side such as radio resource management, quality of service (QoS, Quality of Service) management, and data compression and encryption, for example, a network device (base station) in an LTE system. User equipment in the embodiments of the present invention is a device that accesses a network side by using a network device, for example, a handheld terminal or a notebook computer.

A time interval in the embodiments of the present invention is a time unit in a time division multiplexing system, for example, a subframe in the LTE system, and a length of one subframe in the LTE system is 1 ms.

In the embodiments of the present invention, that a plurality of user equipments are in similar channel conditions may be that a difference between channel parameters of the plurality of user equipments is within a specific threshold.

Figure 1:
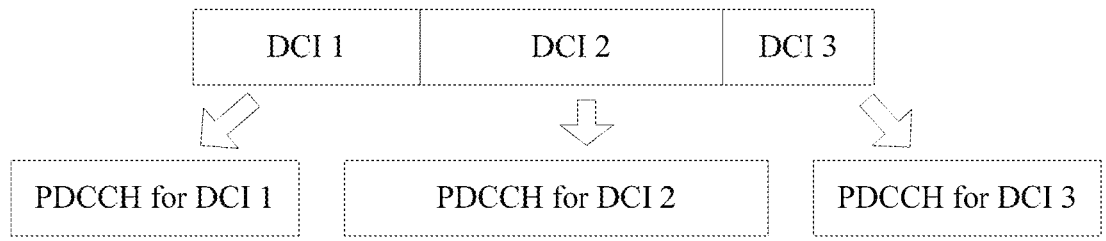
FIG. 1 shows a coding manner of DCI in the prior art.

FIG. 1 shows a system architecture of an LTE system and a 5G system according to an embodiment of the present invention. Each network element and each interface are described as follows:

Mobility management entity (MME, Mobility Management Entity)/serving gateway (S-GW, Serving Gateway): The MME is a key control node in 3rd Generation Partnership Project (3GPP, 3rd Generation Partnership Project) LTE, is a core network element, and is mainly responsible for a signaling processing part, namely, a control plane function, including functions such as access control, mobility management, attachment and detachment, a session management function, and gateway selection. The S-GW is an important network element in a core network in 3GPP LTE, and is mainly responsible for a user plane function of forwarding user data, to be specific, routing and forwarding a packet under control of the MME.

Evolved NodeB (Evolved NodeB, eNB)/transmission/reception node (transmission/reception point, TRP): The eNB is a network device in the LTE system, and the TRP is a network device in the 5G system, and is mainly responsible for functions on an air interface side such as radio resource management, quality of service (QoS, Quality of Service) management, and data compression and encryption. On a core network side, the eNB is mainly responsible for forwarding control plane signaling to the MME and forwarding user plane service data to the S-GW.

UE: The UE is a device that accesses a network side by using an eNB in LTE. For example, the UE may be a handheld terminal, a notebook computer, or another device that can access a network.

S1 interface: The S1 interface is a standard interface between the eNB and a core network. The eNB is connected to the MME by using an S1-MME interface, and is configured to control signaling transmission. The eNB is connected to the S-GW by using an S1-U interface, and is configured to transmit user data. The S1-MME interface and the S1-U interface are collectively referred to as the S1 interface.

X2 interface: The X2 interface is a standard interface between eNBs, configured to implement interworking between network devices.

Uu interface: The Uu interface is a wireless interface between UE and a network device. The UE accesses the LTE network by using the Uu interface.

Figure 2:
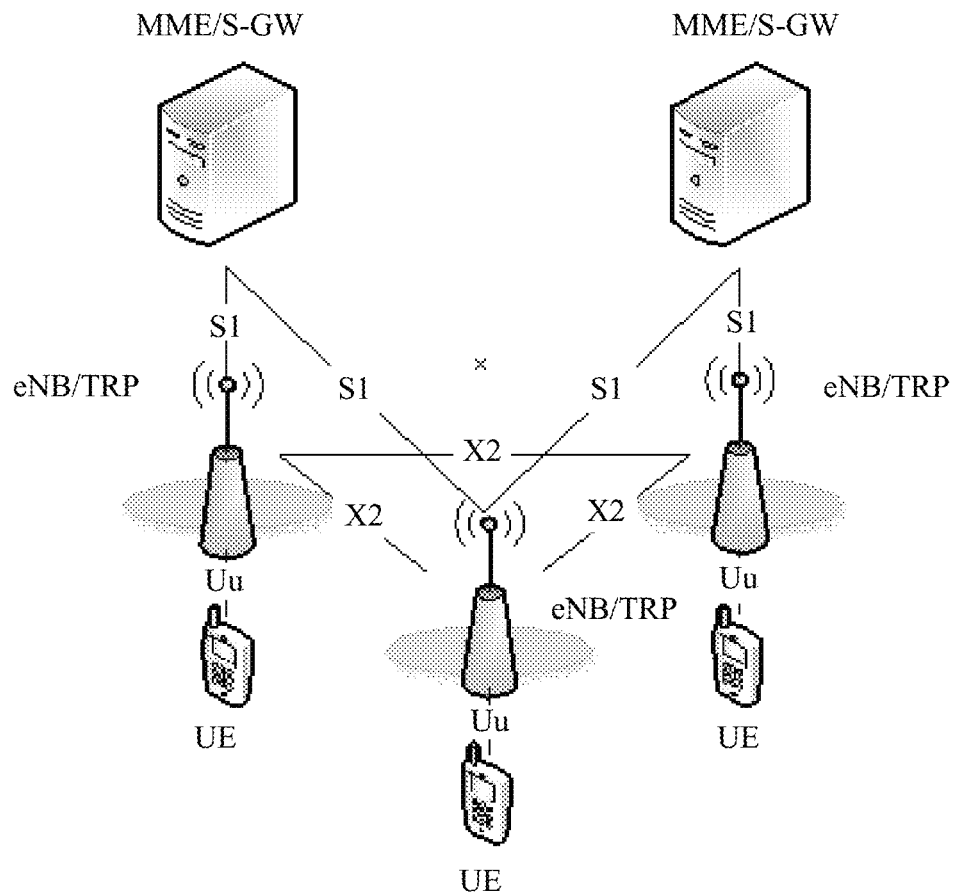
FIG. 2 is a schematic diagram of an LTE/NR system architecture according to an embodiment of the present invention.

A control information transmission method in the embodiments of the present invention may be applied to control information transmission between a base station and UE in FIG. 2. In an LTE system, control information mainly includes downlink control information (Downlink control information, DCI) and uplink control information (Uplink control information, UCI).

The DCI is used to transmit uplink/downlink scheduling information and related common control information, and is divided into a plurality of formats and carries different functions. Main formats are listed in the following table:

| DCI format | Function |
| --- | --- |
| 0 | Uplink data channel scheduling |
| 1 | Downlink single-codeword data channel scheduling |
| 1a | Compact downlink single-codeword data channel scheduling |
| 1b | Precoded compact downlink single-codeword data channel scheduling |
| 1c | More compact downlink single-codeword data channel scheduling |
| 1d | Compact downlink single-codeword data channel scheduling with precoding and power offset information |
| 2 | Downlink multi-codeword data channel scheduling in closed-loop spatial multiplexing |
| 2a | Downlink multi-codeword data channel scheduling in open-loop spatial multiplexing |
| 3 | Power control information transmission on an uplink control channel and a data channel, where power control information is indicated by 2 bits |
| 3a | Power control information transmission on an uplink control channel and a data channel, where power control information is indicated by 2 bits |

After coding and modulating DCI, the base station maps the DCI to a downlink control channel (usually located in first one to three OFDM symbols of each subframe) to send the DCI to the user equipment. In the LTE system, a plurality of pieces of DCI delivered by the base station in a same subframe are modulated and mapped after being separately coded. A specific modulation manner may be shown in FIG. 1.

A code rate of the DCI is determined by the base station based on a channel condition of the UE. In the LTE system, there are four aggregation levels of time-frequency resources used for carrying a PDCCH, and the four aggregation levels respectively correspond to a code length of 72 bits, a code length of 144 bits, a code length of 288 bits, and a code length of 576 bits.

Given a length of the DCI, the base station may send the DCI to UE in a better channel condition through a PDCCH corresponding to a lower aggregation level (for example, a code length is 72 bits or 144 bits), and send the DCI to UE in a poorer channel condition through a PDCCH corresponding to a higher aggregation level (for example, a code length is 288 bits or 576 bits).

However, a coding gain of channel coding increases as a code length increases, and in such a control information coding manner using a short code length in an existing LTE system, a very high coding gain cannot be obtained.

In the embodiments of the present invention, to resolve the foregoing problem of the coding gain, a plurality of pieces of DCI s are jointly coded into a long code, to obtain a relatively high coding gain. However, if a coding manner such as a Turbo or low-density parity-check code (Low Density Parity Check Code, LDPC) is used, the UE at a receive end needs to decode the entire long code, and can obtain, only when completing the decoding, a part that is of the long code and that belongs to the UE. In comparison with coding the DCI by using a short code, in such a joint coding and decoding solution using a long code, a processing latency of the UE is increased.

To resolve the foregoing problem of the processing latency, in the embodiments of the present invention, further, a plurality of pieces of DCI are jointly coded in a polar coding manner. For example, the plurality of pieces of DCI are cascaded and sorted in a preset order, and then the cascaded and sorted plurality of pieces of DCI are jointly coded in the polar coding manner, to form one codeword, and further, the codeword is modulated and a time-frequency resource is mapped to the codeword, so that the codeword is sent to the UE.

The UE may end a decoding process in advance by using a feature of sequential polar code decoding. To be specific, a polar code decoding process is bit-by-bit hard decision output, and in a bit-by-bit decoding process, when DCI of the UE is obtained through decoding, the UE may stop decoding, and start to perform a next operation based on DCI content. Certainly, in a process in which the UE decodes the DCI, CRC check needs to be performed, and if the check succeeds, the DCI is the DCI of the UE.

A feedback information transmission method in the embodiments of the present invention may be applied to feedback information transmission between the base station and the UE in FIG. 2.

The UCI is used to carry downlink data ACK/NACK feedback information, channel state information, sending request information, and the like sent by the UE to the base station, and the UCI is transmitted on a physical uplink control channel (Physical Uplink Control Channel, PUCCH) or a physical uplink shared channel (Physical Uplink Shared Channel, PUSCH). The PUCCH is located on two sidebands of uplink system bandwidth. Feedback information in the embodiments of the present invention may be downlink data ACK/NACK feedback information sent by the UE to the base station, or may be uplink data ACK/NACK feedback information sent by the base station to the UE.

In the LTE system, a PUCCH format 1/1a/1b is used to transmit a 1-bit or 2-bit ACK/NACK and send request information, a format 2/2a/2b is used to transmit 20-bit channel state information and a 1-bit or 2-bit ACK/NACK feedback, a format 3 is used to transmit an ACK/NACK feedback with a maximum of 22 bits in a case of carrier aggregation, and formats 4 and 5 are used to transmit a longer ACK/NACK feedback (greater than 22 bits).

In addition, downlink data ACK/NACK feedback information in the LTE is for a transmission block (transmission block, TB). In other words, the downlink data ACK/NACK feedback information is a TB-level ACK/NACK feedback. When the TB is greater than 6144 bits, the TB needs to be split into a plurality of code blocks (code block, CB). In future 5G to obtain a higher throughput, the TB may be very large, and needs to be split into tens or even hundreds of CBs for coding. In this case, a simple TB-level ACK/NACK has relatively low efficiency, and a transmission error of one CB may cause retransmission of the entire TB.

To resolve the foregoing problem, the embodiments of the present invention propose that a relatively small data transmission unit may be used to perform feedback in the future 5G for example, a CB-level ACK/NACK feedback manner, and an ACK/NACK of tens or even hundreds of bits is required. In the embodiments of the present invention, a plurality of pieces of feedback information of data carried by a plurality of CBs are jointly coded in a polar coding manner, and a receive end performs decoding processing in a sequential decoding manner. Once the UE decodes feedback information indicating that retransmission needs to be performed, the UE retransmits data carried by a data transmission unit corresponding to the feedback information.

It should be noted that the data transmission unit in the embodiments of the present invention may be a basic unit for transmitting data. For example, the data transmission unit includes a code block (code block, CB), and one piece of feedback information may correspond to at least one CB. For example, one piece of feedback information may be used to feed back data transmitted by two consecutive CBs.

Alternatively, the data transmission unit may be a basic carrying unit that carries transmitted data. For example, the data transmission unit may include a component carrier (component carrier, CC), the CC is used to carry a transmission block (transmission block, TB), and one piece of feedback information corresponds to one CC.

Figure 3:
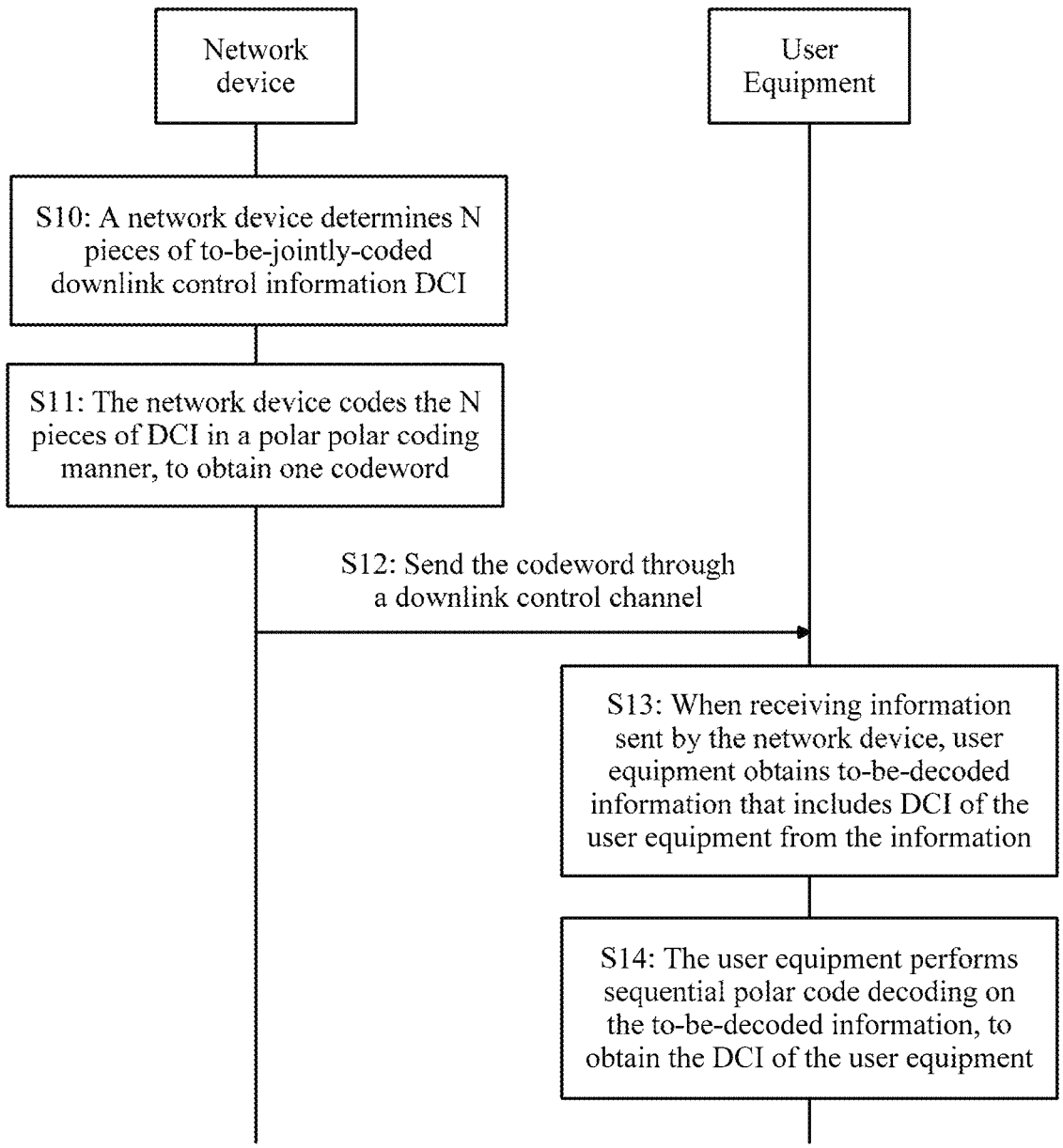
FIG. 3 is an interaction diagram of a control information transmission method according to an embodiment of the present invention.

FIG. 3 shows a method for transmitting control information in a 5G network through air interface information interaction between a network device and user equipment according to an embodiment of the present invention. As shown in FIG. 3, the method includes the following steps.

S10: The network device determines N pieces of to-be-jointly-coded downlink control information DCI, where N is an integer greater than or equal to 2.

Figure 4:
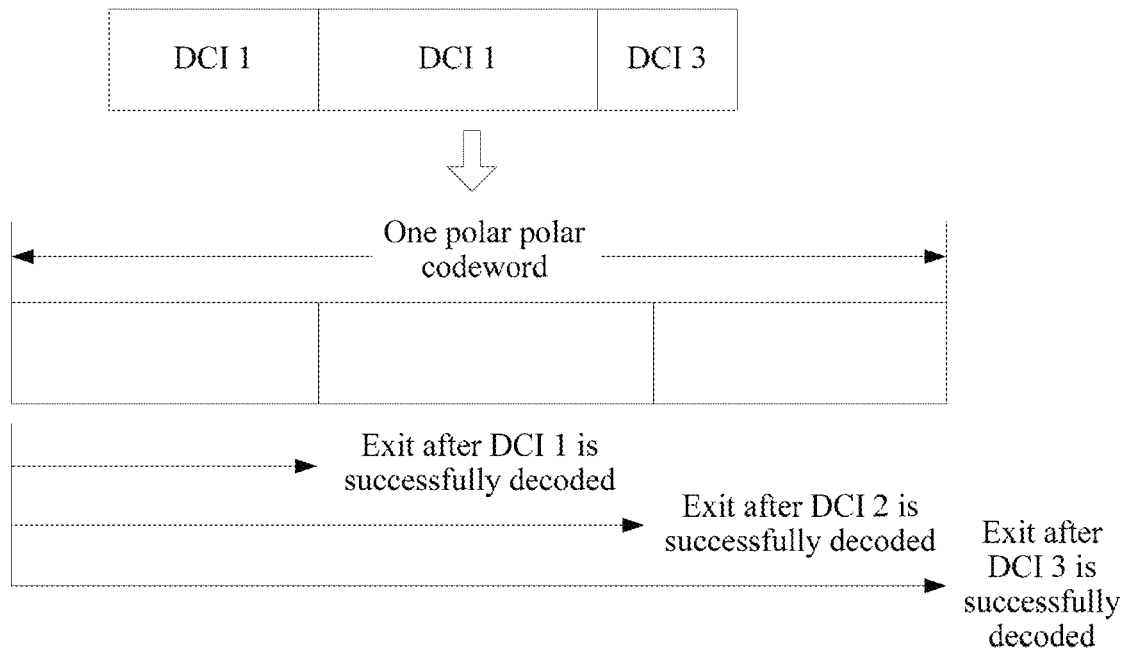
FIG. 4 is a schematic diagram of joint coding of a plurality of pieces of DCI according to an embodiment of the present invention.

In this embodiment of the present invention, the network device determines the N pieces of to-be-jointly-coded DCI, and N is an integer greater than or equal to 2. As shown in FIG. 4, the network device determines that DCI 1, DCI 2, and DCI 3 are three pieces of to-be-jointly-coded DCI.

Figure 5:
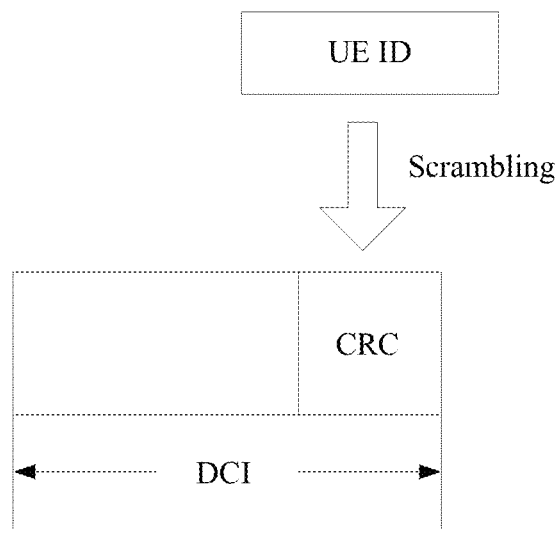
FIG. 5 is a schematic diagram of internal scrambling of DCI according to an embodiment of the present invention.

Optionally, as shown in FIG. 5, each piece of DCI includes DCI and a CRC, and the CRC included in the DCI is formed by performing scrambling by using a preset identifier (for example, a user equipment ID) corresponding to user equipment of the DCI. After decoding all DCI bits, the user equipment at a receive end first descrambles the CRC in the DCI by using a preset identifier corresponding to the user equipment, and then checks the DCI in the DCI by using a descrambled CRC. If the check succeeds, it indicates that the DCI is successfully received.

When an error occurs in a DCI decoding process, the CRC check fails. Even if the DCI is correctly decoded, if a CRC part is not descrambled by using a correct user equipment ID, the DCI cannot pass the CRC check. In other words, this mechanism prevents false detection of DCI between different user equipments.

The network device may determine, according to a preset rule, the N pieces of DCI that need to be jointly coded. Optionally, the preset rule may use different methods. For example, a plurality of DCIs that use a same aggregation level may be combined based on different channel conditions of users with reference to a method used by a base station to determine an aggregation level used by each piece of DCI in LTE. Alternatively, a plurality of pieces of DCI that carry information indicating a same function are combined based on a function indicated by information carried in DCI. For example, all pieces of DCI that indicate a function of uplink data channel scheduling are combined for polar coding, and all pieces of DCI that indicate a function of downlink single-codeword data channel scheduling are combined for polar coding. The preset rule is not limited in this embodiment of the present invention.

S11: The network device jointly codes the N pieces of DCI in a polar coding manner, to obtain one codeword.

In this embodiment of the present invention, after determining the N pieces of to-be-jointly-coded DCI, the network device cascades the determined N pieces of DCI. In a cascading operation, the pieces of DCI may be sorted in a preset order, and the preset order may be at least one of the following orders: DCI of user equipment with a higher priority ranks higher than DCI of user equipment with a lower priority; DCI of user equipment in a better channel condition ranks higher than DCI of user equipment in a poorer channel condition; DCI of latency-sensitive user equipment ranks higher than DCI of latency-insensitive user equipment; and the like.

It should be noted that when the N pieces of DCI are sorted in the preset order, one of the orders may be selected as a reference to sort the N pieces of DCI, for example, the N pieces of DCI are sorted by using a high priority as a reference. Optionally, usually, a priority is preferably selected as a reference for sorting. If no priority is labeled for the user equipment, latency sensitivity is selected as a reference for sorting. If latency sensitivity cannot be determined, a channel condition is used as a reference for sorting.

When the preset order includes at least two orders, the at least two orders may be sorted and selected based on importance. For example, importance of a priority is greater than importance of latency sensitivity, and the importance of latency sensitivity is greater than importance of a channel condition. When the N pieces of DCI are being sorted, the N pieces of DCI may be first sorted based on priorities of user equipments of the N pieces of DCI; if user equipments of two or more pieces of DCI have a same priority, latency sensitivity of the user equipments of the two or more pieces of DCI is considered, and DCI of latency-sensitive user equipment ranks higher; and if user equipment of two or more pieces of DCI have same latency sensitivity, channel conditions of the user equipment of the two or more pieces of DCI are then considered, and DCI of user equipment in a good channel condition ranks higher.

The cascaded N pieces of DCI are jointly coded by using a polar code, to obtain one polar codeword. As shown in FIG. 4, after DCI 1, DCI 2, and DCI 3 are cascaded and sorted, the DCI 1, the DCI 2, and the DCI 3 are jointly coded into one polar codeword. A codeword length is a fixed value provided in a standard (for example, four possible codeword lengths are provided in the LTE system).

Channel encoding is usually performed in a communications system to improve data transmission reliability and ensure communication quality. A polar code is a code proposed by Arikan that is first proved in theory to be capable of achieving a Shannon capacity and have low coding-decoding complexity. The polar code is a linear block code. A generator matrix of the polar code is $G_N$, and a coding process of the polar code is $x_1^N = u_1^N G_N$, where $u_1^N = (u_1, u_2, \ldots, u_N)$ is a binary row vector whose length (namely, code length) is N. $G_N$ is an N×N matrix, and $G_N = F_2^{\otimes(\log_2(N))}$. Herein, $$F_2 = \begin{bmatrix} 1 & 0 \\ 1 & 1 \end{bmatrix},$$

and $F_2^{\otimes(\log_2(N))}$ is defined as a Kronecker (Kronecker) product of $\log_2 N$ matrices $F^2$. The foregoing addition and multiplication operations are addition and multiplication operations in a binary Galois field (Galois Field).

In a polar code coding process, some bits in $u_1^N$ are used to carry information and are referred to as information bits, and a set of indexes of these bits is denoted by A; and other bits are set to fixed values that are agreed on by a transmit end and a receive end in advance and are referred to as fixed bits, and a set of indexes of these bits is denoted by a complementary set $A^c$ of A. Generally, these fixed bits are usually set to 0. A sequence of the fixed bits may be randomly set provided that the transmit end and the receive end reach an agreement in advance. Therefore, coding output of the polar code may be simplified as $x_1^N = u_A G_N(A)$. Herein, $u_A$ is a set of information bits in $u_1^N$; $u_A$ is a row vector whose length is K, in other words, |A|=K; |•| indicates a quantity of elements in the set; K is a size of an information block; $G_N(A)$ is a sub-matrix that is in the matrix $G_N$ and that is obtained by using rows corresponding to the indexes in the set A; and $G_N(A)$ is a K×N matrix. A construction process of the polar code is a selection process of the set A. This determines polar code performance. Common construction methods, namely, methods for calculating polarization channel reliability include density evolution (density evolution, DE), Gaussian approximation (Gaussian approximation, GA), and linear fitting. It can be learned from a coding matrix that a code length of an original polar code is an integral power of 2. In actual application, rate matching needs to be performed to implement a polar code of any code length.

Figure 6:
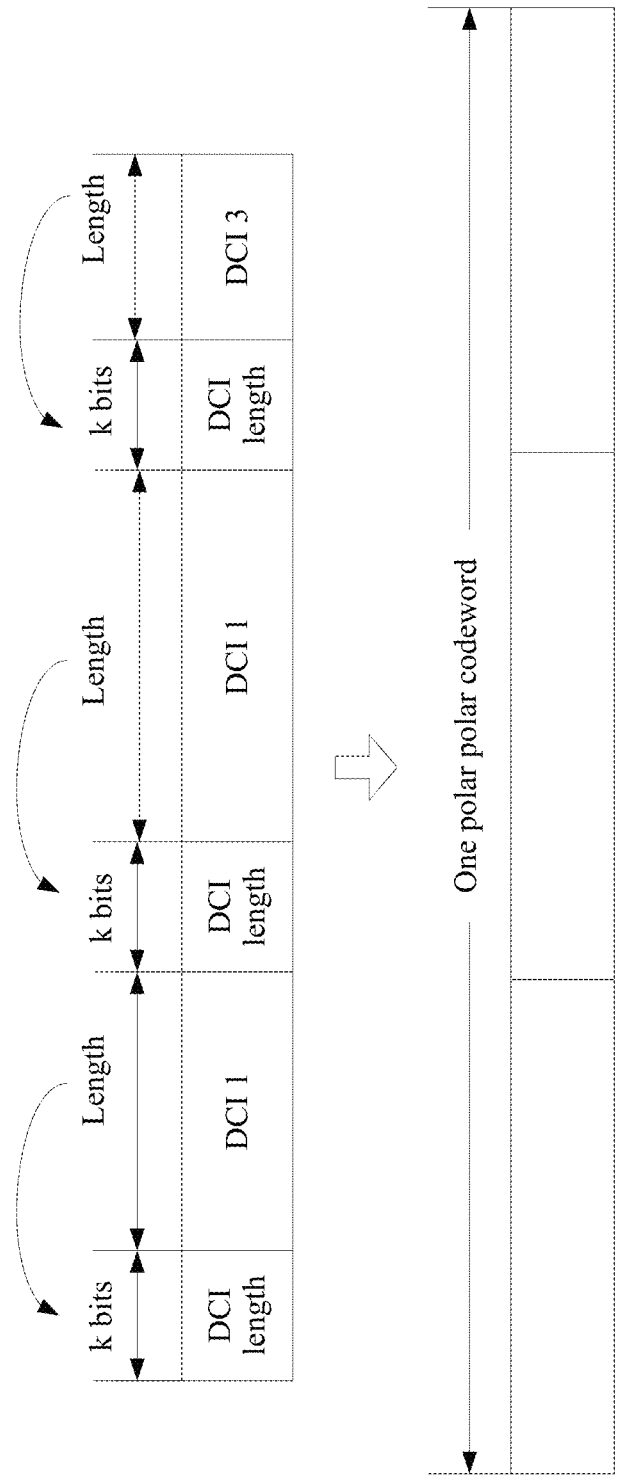
FIG. 6 is a schematic diagram of DCI coding according to an embodiment of the present invention.

Optionally, as shown in FIG. 6, before the cascaded N pieces of DCI are jointly coded by using the polar code, DCI length information (fixed k bits may be used to represent a length, and a maximum DCI length that can be represented is $2^k$, for example, when k=6, a maximum DCI length that can be represented is 64 bits) of each piece of DCI is added to the DCI.

The N pieces of DCI to which DCI length information is added are cascaded, and a sorting order of cascading may be that DCI of user equipment in a better channel condition ranks higher than DCI of user equipment in a poorer channel condition, and DCI of user equipments in same channel conditions may be sorted at random.

The cascaded N pieces of DCI to which the DCI length information is added are coded together by using the polar code, to obtain one polar codeword. A codeword length may be a fixed value provided in a standard (for example, four possible code lengths are provided in the LTE system).

Figure 7:
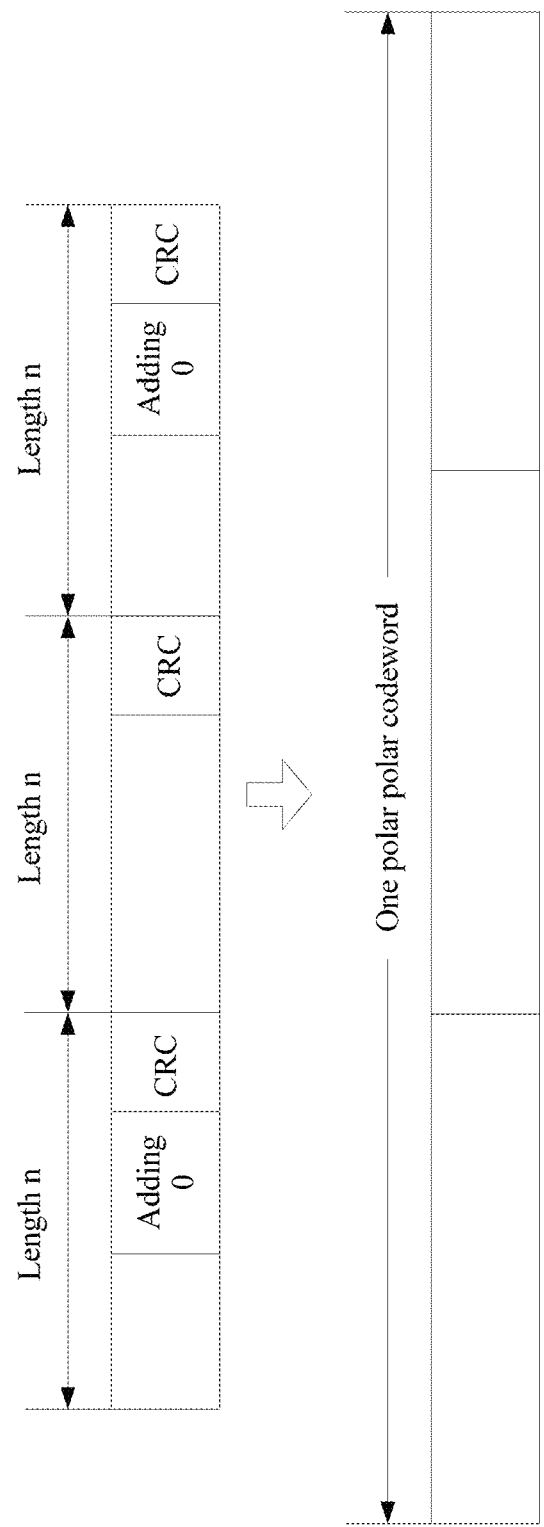
FIG. 7 is a schematic diagram of another DCI coding according to an embodiment of the present invention.

Optionally, as shown in FIG. 7, w possible values of a DCI length are provided in a standard. For example, four possible values are 30, 40, 50, and 60. The foregoing lengths may be obtained by adding 0 to DCI useful information, and a CRC is added by using a preset identifier corresponding to the user equipment. As shown in FIG. 7, n may be any one of 30, 40, 50, and 60.

The N pieces of DCI on which zero adding processing is performed are cascaded, and a sorting order of cascading may be that DCI of user equipment in a better channel condition ranks higher than DCI of user equipment in a poorer channel condition, and DCI of user equipments in same channel conditions may be sorted at random.

The cascaded N pieces of DCI are jointly coded by using the polar code, to obtain one polar codeword. A codeword length may be a fixed value provided in a standard (for example, four possible codeword lengths are provided in the LTE system).

S12: The network device maps the codeword to a time-frequency resource of a downlink control channel for sending.

In this embodiment of the present invention, after jointly coding the N pieces of DCI to obtain one codeword, the network device performs operations such as scrambling, interleaving, and modulation, and then maps information to a time-frequency resource of a corresponding downlink control channel for sending.

Specific methods of the operations such as scrambling, modulation, and/or interleaving are not limited. In a time-frequency resource mapping operation process, the network device may determine a location of the time-frequency resource according to a preset channel resource mapping rule, for example, calculate the location of the time-frequency resource by using some information (such as a system frame number) that is known to both the transmit end and the receive end.

It should be noted that, in the foregoing process of jointly coding and processing a plurality of pieces of DCI, the plurality of DCIs need to be jointly coded into one polar codeword, and a code length of the codeword and a time-frequency resource (for example, a PDCCH area in the LTE system) that is used to send downlink control information and that is included in each time interval (the time interval may be a subframe in the LTE system) in a system jointly determine a quantity of downlink control information polar codewords included in each subframe.

Given a quantity of time-frequency resources carrying downlink control information that are included in each time interval, if a relatively long polar code is selected, a total quantity of codewords is relatively small, and if a relatively short polar code is selected, the total quantity of codewords is relatively large.

In this embodiment of the present invention, the following two solutions may be considered for selecting a quantity of codewords and a code length of a polar code of a control channel used for carrying DCI:

1. A time-frequency resource of a downlink control channel in one time interval carries one codeword, in other words, an entire control channel area that is used to carry the DCI in one time interval carries one codeword. In this solution, a highest coding gain can be obtained, but an average processing latency of the user equipment at the receive end is also the largest.

2. Based on a concept of an aggregation level in the LTE system, user channel conditions are divided into M types, M polar codewords are used in a control channel area that carries the DCI, and the M polar codewords separately correspond to different channel conditions. To be specific, user equipments of all pieces of DCI included in one codeword are in same or similar channel conditions. M is an integer greater than or equal to 2.

S13: When user equipment receives information sent by the network device, the user equipment obtains to-be-decoded information that includes DCI of the user equipment from the information, where the to-be-decoded information carries the codeword obtained by the network device by jointly coding the N pieces of DCI in the polar coding manner, and N is an integer greater than or equal to 2.

In this embodiment of the present invention, the information sent by the network device reaches the user equipment through a channel. When receiving the information sent by the network device, the user equipment may obtain the to-be-decoded information that includes the DCI of the user equipment from the information according to a preset channel resource mapping rule (the preset channel resource mapping rule is the same as the preset channel resource mapping rule in step S12). The preset channel resource mapping rule is known to both the receive end and the transmit end (namely, the network device and the user equipment).

Optionally, the user equipment calculates, by using information (for example, a system frame number) that is known to both the receive end and the transmit end, a possible time-frequency resource location of the to-be-decoded information that includes the DCI of the user equipment, and obtains the to-be-decoded information after performing operations such as receiving, demodulation and de-interleaving, and descrambling. It should be noted that the to-be-decoded information carries the codeword obtained by the network device by jointly coding the N pieces of DCI in the polar coding manner in step S11, where N is an integer greater than or equal to 2.

S14: The user equipment performs sequential polar code decoding on the to-be-decoded information, to obtain the DCI of the user equipment.

In this embodiment of the present invention, the to-be-decoded information carries the codeword obtained after the N pieces of DCI are jointly coded in the polar coding manner, and the user equipment needs to decode the to-be-decoded information to obtain the DCI of the user equipment.

Optionally, each piece of DCI includes a CRC field scrambled by using a preset identifier (for example, a user equipment ID) corresponding to user equipment of the DCI. When performing sequential polar code decoding on the to-be-decoded information, the user equipment descrambles a CRC of each segment of decoded DCI by using the preset identifier corresponding to the user equipment, checks an information part of the DCI by using a descrambled CRC, and if the check passes, the user equipment stops decoding, and performs a next operation based on DCI content.

As shown in FIG. 4, when the user equipment decodes the to-be-decoded information, the user equipment exits decoding when decoding DCI that belongs to the user equipment. As shown in the figure, when the to-be-decoded information is being sequentially decoded, user equipment of the DCI 1 exits first, and then user equipment of the DCI 2 succeeds in decoding and exits, and finally, user equipment of the DCI 3 succeeds in decoding and exits.

When the user equipment checks the information part of the DCI by using the CRC descrambled by using the preset identifier corresponding to the user equipment, if the check fails, the user equipment continues to decode a following piece of DCI, descrambles a CRC of the DCI by using the preset identifier corresponding to the user equipment again, and checks an information part of the DCI by using a descrambled CRC until decoding succeeds and the DCI of the user equipment is obtained, or until the entire codeword is decoded. As shown in FIG. 4, when the user equipment of the DCI 2 is decoding the DCI 1, because the DCI 1 is not the DCI of the user equipment, a case in which verification fails occurs.

Optionally, the preset identifier corresponding to the user equipment may be a unique identifier pre-allocated to the user equipment, for example, a unique identifier is allocated to each user equipment based on a function of the DCI. An identifier of user equipment in the LTE system is used as an example below.

In existing LTE, a CRC in DCI is scrambled by using a radio network temporary identifier (Radio Network Temporary Identity, RNTI). There are a plurality of types of RNTIs, and a commonly used C-RNTI is a unique identifier allocated by a network to the user equipment. The identifier is allocated by a base station to a user after the user equipment successfully accesses the network.

An SPS-RNTI is a user equipment identifier used for scrambling a CRC in scheduling DCI in a user semi-persistent service, and RNTIs used for scheduling-type DCI of common control information include: an SI-RNTI used for scrambling a CRC in scheduling DCI of system broadcast control information, an RA-RNTI used for scrambling a CRC in scheduling DCI in random access information, and a P-RNTI used for scrambling a CRC in scheduling DCI in paging information.

These RNTIs have a feature that both the receive end and the transmit end know content of the RNTIs. Therefore, the transmit end (the network device) scrambles the CRC in the DCI by using the RNTI, and only user equipment that knows content of the RNTI can correctly descramble the CRC and complete CRC check.

Optionally, the preset identifier corresponding to the user equipment may be a group identifier pre-allocated to a group in which the user equipment is located, the group in which the user equipment is located may include a plurality of user equipments, and preset identifiers corresponding to the plurality of user equipments are the same group identifier.

Optionally, if the network device codes the N pieces of DCI by using a codeword structure shown in FIG. 6, the network device adds DCI length information to each piece of DCI before jointly coding the cascaded N pieces of DCI by using the polar code.

Correspondingly, when performing sequential polar code decoding on the to-be-decoded information, the user equipment at the receive end first obtains k-bit DCI length information, calculates, based on the k-bit DCI length information, a DCI length indicated by the DCI length information, and denotes the DCI length as a.

After learning that the DCI length is a through calculation, the user equipment continues to decode a bits, and descrambles the CRC of the DCI by using the preset identifier corresponding to the user equipment. Then, the user equipment checks the information part of the DCI by using the descrambled CRC. If the check succeeds, it indicates that the user equipment has found DCI of the user equipment, and the user equipment exits decoding, and performs a next operation according to an instruction in the DCI, and does not need to decode entire to-be-decoded information. In this way, an average processing latency of the user equipment can be reduced.

If the check performed by the user equipment on the CRC of the DCI fails, it indicates that the DCI does not belong to the user equipment, and the user equipment continues to decode following k-bit DCI length information, to obtain length information of a next piece of DCI, and denotes the length information as b. The user equipment continues to decode b bits, and repeats a CRC descrambling and CRC check process until DCI of the user equipment is found, or until decoding ends.

Optionally, if the network device codes the N pieces of DCI by using a codeword structure shown in FIG. 7, w possible values of a DCI length are provided in a standard, for example, four possible values are 30, 40, 50, and 60. The foregoing lengths may be obtained by adding 0 to DCI useful information, and a CRC is added by using the preset identifier corresponding to the user equipment. As shown in FIG. 7, n may be any one of 30, 40, 50, and 60.

Correspondingly, when performing sequential polar code decoding on the to-be-decoded information, the user equipment at the receive end first decodes n bits, and descrambles the CRC of the DCI by using the preset identifier corresponding to the user equipment. Then, the user equipment checks the information part of the DCI by using the descrambled CRC. If the check succeeds, it indicates that the user equipment has found the DCI of the user equipment, and exits decoding. The user equipment performs a next operation according to the instruction in the DCI, and does not need to decode entire decoding information. In this way, an average processing latency of the user equipment can be reduced.

If the user equipment fails to check the CRC of the DCI, it indicates that the DCI does not belong to the user equipment, and the user equipment continues to decode n bits, and repeats a CRC descrambling and CRC check process until the DCI of the user equipment is found, or until decoding ends.

In this embodiment of the present invention, when transmitting DCI, the network device determines the N pieces of to-be-jointly-coded DCI, and jointly codes the N pieces of DCI in the polar coding manner, to obtain one codeword. In this joint coding manner, a relatively high channel coding gain can be obtained, and DCI transmission reliability can be improved. In addition, because the polar coding manner is used, the user equipment can quickly obtain the DCI of the user equipment through sequential decoding, and perform a corresponding operation. Therefore, a relatively low average processing latency of the user equipment is obtained.

Figure 8:
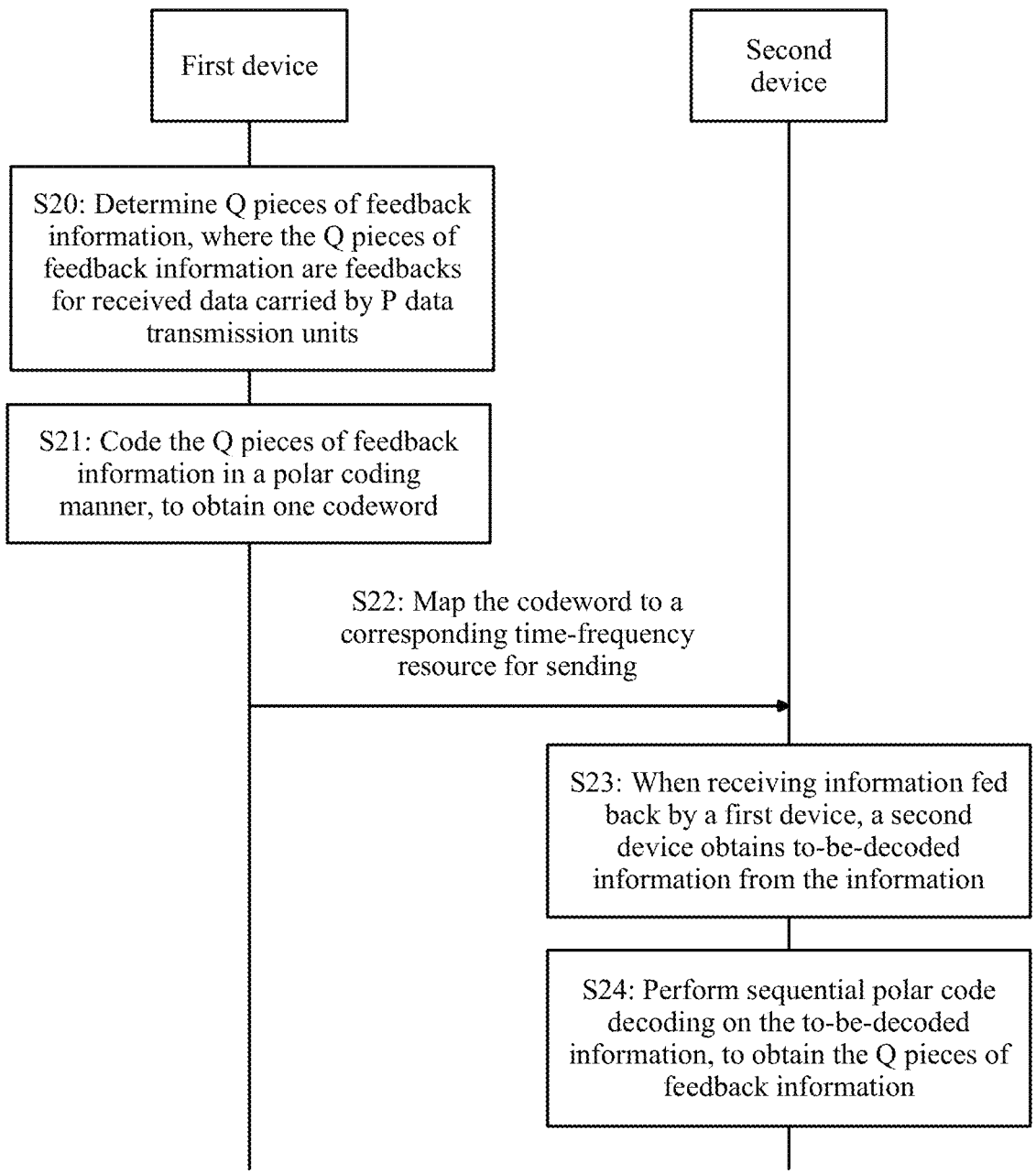
FIG. 8 is an interaction diagram of a feedback information transmission method according to an embodiment of the present invention.

FIG. 8 shows a method for transmitting feedback information in a 5G network through air interface information interaction between a first device and a second device according to an embodiment of the present invention. If the first device is a network device, the second device is user equipment, and if the first device is user equipment, the second device is a network device. As shown in FIG. 8, the method includes the following steps.

S20: The first device determines Q pieces of feedback information, where the Q pieces of feedback information are feedbacks for received data carried by P data transmission units, Q is an integer greater than or equal to 2, P is greater than or equal to Q, and P is an integer.

S21: The first device jointly codes the Q pieces of feedback information in a polar coding manner, to obtain one codeword.

S22: The first device maps the codeword to a corresponding time-frequency resource for sending.

In this embodiment of the present invention, the first device and the second device interact with each other. Specifically, optionally, the second device sends data to the first device, and the data is carried by the P data transmission units. After receiving the data, the first device needs to check the data, to determine whether the data carried by the P data transmission units is correctly received.

If the first device correctly receives data carried by a specific data transmission unit, the first device needs to feed back, to the second device, feedback information used to indicate that the data is correctly received, so that the second device deletes, from a cache, the data carried by the data transmission unit. If the first device incorrectly receives data carried by a specific data transmission unit, the first device needs to feed back, to the second device, feedback information used to indicate that the data is incorrectly received, so that the second device retransmits the data carried by the corresponding data transmission unit.

Optionally, the feedback information may be ACK/NACK feedback information for downlink data in an LTE system, and the ACK/NACK feedback information in the LTE is for a transmission block (transmission block, TB), in other words, is a TB-level ACK/NACK feedback. The TB is a data transmission unit.

When the TB is greater than 6144 bits, the TB needs to be split into a plurality of code blocks (code block, CB). In future 5G to obtain a higher throughput, the TB may be very large, and needs to be split into tens or even hundreds of CBs for coding. In this case, a simple TB-level ACK/NACK has relatively low efficiency, and a transmission error of one CB may cause retransmission of the entire TB.

Future 5G may have feedbacks for data carried by various data transmission units. For example, the data transmission unit may be a basic unit for transmitting data. For example, the data transmission unit includes the CB, and one piece of feedback information may correspond to at least one CB. For example, one piece of feedback information may be used to feed back data transmitted by two consecutive CBs.

Alternatively, the data transmission unit may be a basic carrying unit that carries transmitted data. For example, the data transmission unit may include a component carrier (component carrier, CC), the CC is used to carry a transmission block (transmission block, TB), and one piece of feedback information corresponds to one CC. Currently, a maximum quantity of CCs in the LTE is 32. In addition, the feedback information is not only an ACK/NACK feedback for downlink data, but may also be an ACK/NACK feedback for uplink data.

It should be noted that if the feedback information is an ACK/NACK feedback for uplink data, the first device is a network device, the second device is user equipment, and the network device may receive uplink data sent by at least one user equipment. Data sent by each user equipment to the network device may be carried by a plurality of data transmission units.

The network device may determine the Q pieces of feedback information with reference to a method of an aggregation level in the LTE, and jointly codes feedback information, that needs to be fed back, of a plurality of user equipments belonging to a same aggregation level in all user equipments. For example, a plurality of user equipments corresponding to the Q pieces of feedback information are in same channel conditions.

If the feedback information is an ACK/NACK feedback for downlink data, the first device is user equipment, the second device is a network device, and the user equipment receives downlink data sent by the network device. The downlink data may be carried by a plurality of data transmission units.

When determining the Q pieces of feedback information, the user equipment may perform feedback for downlink data that is carried by the P data transmission units and sent by the network device to the user equipment. It should be noted that one piece of feedback information may be used to feed back whether data carried by at least one data transmission unit is correctly received.

For example, one piece of feedback information may be used to feed back whether data carried by three data transmission units is correctly received. To be specific, if any data in the data carried by the three data transmission units is incorrectly received, feedback information used to indicate a data receiving error is fed back. When retransmitting data, the network device also needs to retransmit all the data carried by the three data transmission units.

Two optional manners for feeding back data carried by a data transmission unit are described below.

Optionally, the data transmission unit is a basic unit for transmitting data, for example, a CB. In future 5G a CB-level ACK/NACK feedback manner requires an ACK/NACK of tens or even hundreds of bits. In this case, processing may be performed through joint coding and decoding and sequential decoding.

Figure 9:
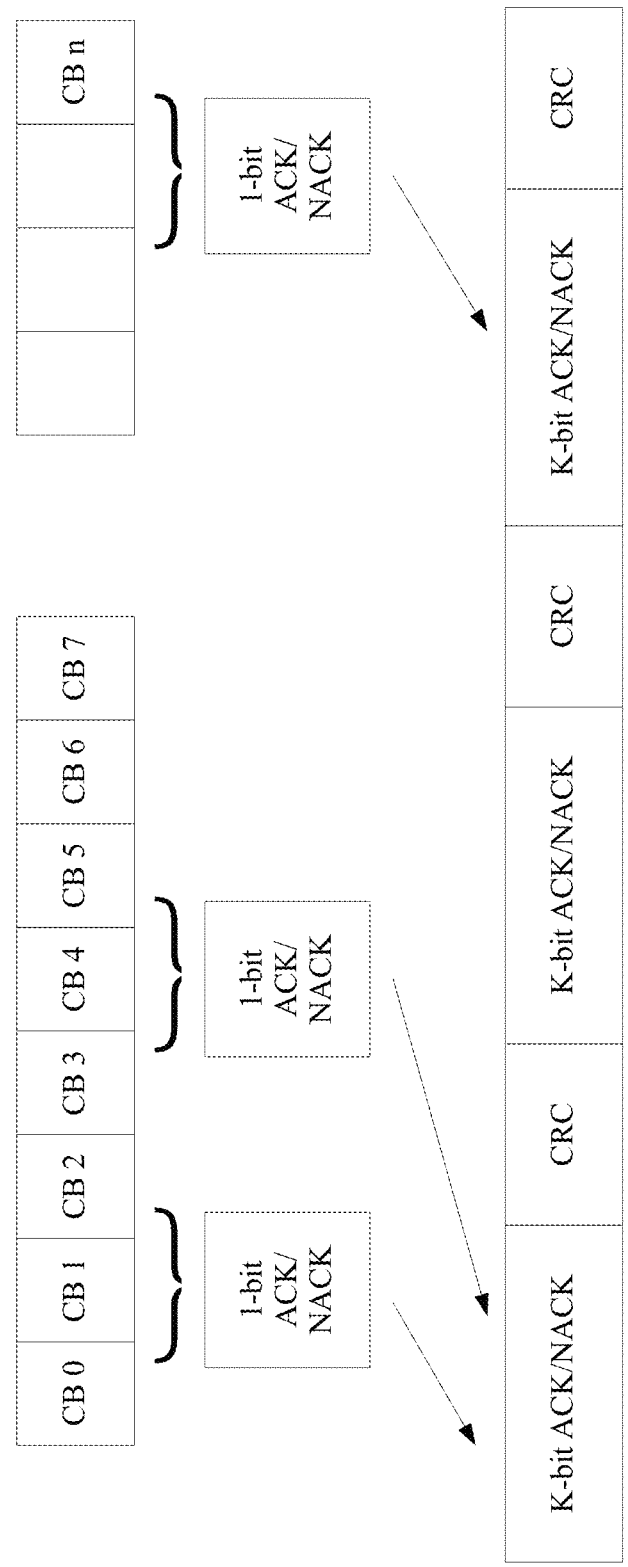
FIG. 9 is a schematic diagram of joint coding for CB-level feedbacks according to an embodiment of the present invention.

One piece of feedback information may correspond to a plurality of CBs. As shown in FIG. 9, three CBs share one ACK/NACK, to save resources. Certainly, three CBs are used as an example for description herein, and do not constitute a limitation on this embodiment of the present invention. For example, five or ten CBs may share one ACK/NACK feedback.

The first device determines the Q pieces of ACK/NACK feedback information based on results of receiving the data carried by the P data transmission units. In this case, receiving results of a plurality of CBs may be fed back by using a same ACK/NACK bit. It should be noted that the ACK/NACK feedback information may be one or more bits. This embodiment of the present invention is described by using an example in which the ACK/NACK feedback information is one bit.

The first device cascades all Q ACK/NACK bits, and adds one CRC after every K bits. A CRC length is determined based on a value of K, so that reliability of a CRC check result is ensured.

The first device performs polar code coding on the cascaded Q pieces of feedback information, to obtain one polar codeword. The first device modulates the codeword, and maps the codeword to a corresponding time-frequency resource for sending. It should be noted that the corresponding time-frequency resource may be a time-frequency resource of a control channel and/or a time-frequency resource of a data channel.

Figure 10:
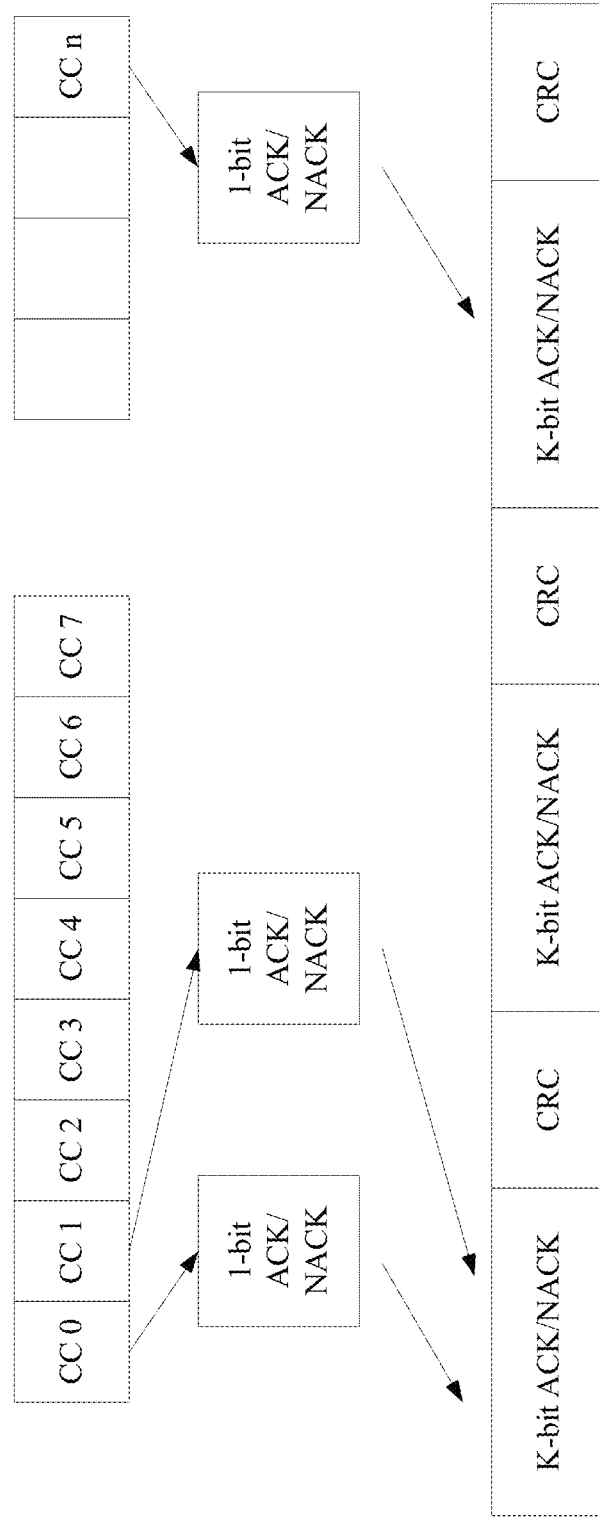
FIG. 10 is a schematic diagram of joint coding for CC-level feedbacks according to an embodiment of the present invention.

Optionally, the data transmission unit is a basic carrying unit for transmitting data, for example, a CC, or a TB carried on a CC. In future 5G as shown in FIG. 10, one piece of feedback information corresponds to one CC. Each piece of feedback information may be an ACK/NACK of one or more bits. This embodiment of the present invention is described by using an example in which the ACK/NACK feedback information is one bit.

As shown in FIG. 10, each component carrier corresponds to 1-bit ACK/NACK feedback information. A plurality of ACK/NACK bits may be cascaded, and one CRC is added after every K bits. A CRC length is determined based on a value of K, so that reliability of a CRC check result is ensured.

The first device jointly codes the cascaded plurality of ACK/NACK bits into one polar codeword in a polar code coding manner. The first device modulates the codeword, and maps the codeword to a corresponding time-frequency resource for sending. It should be noted that the corresponding time-frequency resource may be a time-frequency resource of a control channel and/or a time-frequency resource of a data channel.

S23: When the second device receives information fed back by the first device, the second device obtains to-be-decoded information from the information, where the to-be-decoded information carries the codeword obtained by the first device by jointly coding the Q pieces of feedback information in the polar coding manner, and Q is an integer greater than or equal to 2.

S24: The second device performs sequential polar code decoding on the to-be-decoded information, to obtain the Q pieces of feedback information.

In this embodiment of the present invention, after the first device sends the feedback information to the second device, the second device receives a signal, and performs demodulation processing, to obtain the to-be-decoded information. The to-be-decoded information carries the codeword obtained by the first device by jointly coding the Q pieces of feedback information in the polar coding manner in step S21. The Q pieces of feedback information are feedbacks sent by the second device to the first device for the data carried by the P data transmission units, in other words, are used to feed back whether the first device correctly receives the data carried by the P data transmission units. For example, the Q pieces of feedback information are ACK/NACK feedback information.

The second device performs sequential polar code decoding on the to-be-decoded information to obtain the Q pieces of feedback information sent by the first device, and determines, based on the feedback information, whether data needs to be retransmitted. For example, when the second device decodes feedback information indicating that data needs to be retransmitted, the second device obtains at least one data transmission unit corresponding to the feedback information, and retransmits data carried by the at least one data transmission unit.

Optionally, when sending the Q pieces of feedback information to the second device, the first device divides the Q pieces of feedback information into R information segments by using K pieces of feedback information as a basic unit, and each information segment includes one CRC. When decoding the to-be-decoded information, the second device performs sequential polar code decoding on the to-be-decoded information in a form of consecutive information segments, and each time one information segment is decoded, the second device checks the information segment by using a CRC of the information segment. If the check succeeds, the second device may determine, based on the decoded K pieces of feedback information, whether to perform retransmission.

Optionally, herein, for example, the feedback information is ACK/NACK feedback information, and the data transmission unit is a CB (in other words, when the second device sends data to the first device, a CB is used as a data transmission unit for carrying the data). One piece of ACK/NACK feedback information is one bit. After decoding K-bit ACK/NACK feedback information and a CRC bit carried after the K-bit ACK/NACK feedback information, the second device performs CRC check.

If the K-bit ACK/NACK feedback information passes the CRC check, the second device determines, based on the K-bit ACK/NACK feedback information obtained through decoding, whether retransmission needs to be performed (in other words, whether there is a NACK), and if retransmission needs to be performed (in other words, whether there is a NACK), the second device retransmits a corresponding CB. As shown in FIG. 9, 1-bit ACK/NACK feedback information corresponds to three CBs. Therefore, if there is a NACK, data carried by the three CBs needs to be retransmitted.

When it is determined, based on the K-bit ACK/NACK feedback information obtained through decoding, whether retransmission needs to be performed, if it is determined that data does not need to be retransmitted (in other words, there is no NACK, for example, there is an ACK), it indicates that a corresponding CB has been correctly received, and the corresponding CB may be deleted from a cache of the second device.

It should be noted that if the CRC check fails when the CRC check is performed on the K-bit ACK/NACK feedback information, a specific quantity of bits are further decoded, and the CRC check is performed again. A similar operation is also used for a CRC check operation for K-bit ACK/NACK feedback information in other information segments, until the entire codeword is decoded.

Optionally, herein, for example, the feedback information is ACK/NACK feedback information, and the data transmission unit is a CC (in other words, when the second device sends data to the first device, a CC is used as a data transmission unit for carrying the data). One piece of ACK/NACK feedback information is one bit. After decoding K-bit ACK/NACK feedback information and a CRC part carried after the K-bit ACK/NACK feedback information, the second device performs CRC check.

If the CRC check passes, the second device determines, based on the K-bit ACK/NACK feedback information obtained through decoding, whether retransmission needs to be determined (in other words, whether there is a NACK), and if retransmission needs to be performed (in other words, whether there is a NACK), the second device retransmits data carried by a corresponding CC, or if retransmission does not need to be performed (in other words, there is no NACK, for example, there is an ACK), it indicates that data carried by a corresponding CC has been correctly received, and the second device deletes the data carried by the corresponding CC from a cache.

If the CRC check fails, the second device continues to decode a specific quantity of bits, and performs CRC check again. A similar operation is also used for an operation for K-bit ACK/NACK feedback information in other information segments, until the entire codeword is decoded.

It should be noted that if the second device is user equipment, the first device is a network device, and the feedback information is a feedback for uplink data. The network device jointly codes the Q pieces of feedback information into one codeword, and the Q pieces of feedback information may be feedbacks for data transmitted by a plurality of user equipments. When specific user equipment performs sequential polar code decoding on the to-be-decoded information, the user equipment needs to obtain feedback information of the user equipment from the Q pieces of feedback information.

Optionally, each piece of feedback information may be scrambled by using a preset identifier corresponding to the user equipment, and when sequentially decoding the to-be-decoded information, the user equipment may descramble and check the to-be-decoded information by using the preset identifier corresponding to the user equipment, to determine whether the feedback information is feedback information of the user equipment.

In this embodiment of the present invention, the first device determines the Q pieces of feedback information, where the Q pieces of feedback information are the feedbacks of the received data carried by the P data transmission units; and further jointly codes the Q pieces of feedback information in the polar coding manner, to obtain one codeword, and maps the codeword to the time-frequency resource for sending. The second device performs sequential polar code decoding to obtain the feedback information, and performs feedback in a form of consecutive relatively small data transmission units, so that feedback efficiency can be improved. In addition, the second device performs sequential decoding, so that the second device can perform processing in advance based on the feedback information, and does not need to wait for complete of decoding of the entire codeword, thereby reducing a processing latency.

Figure 11A:
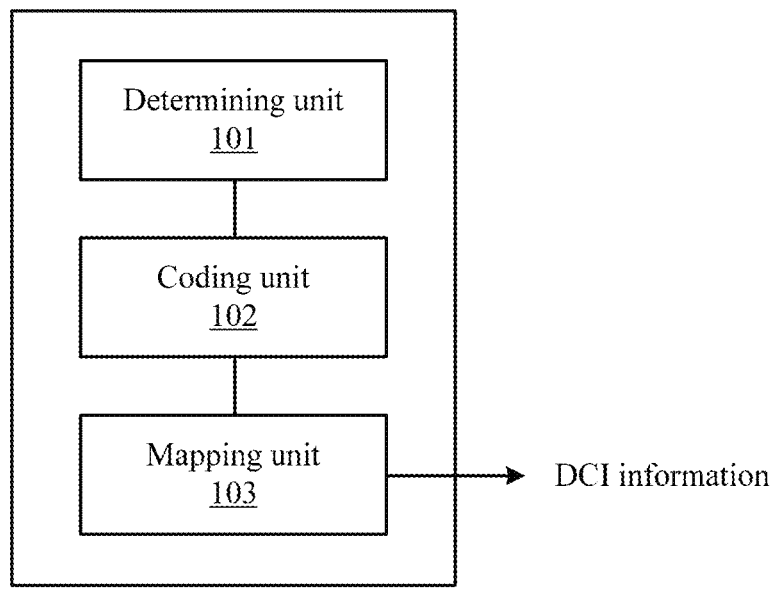
FIG. 11a is a schematic structural diagram of a control information transmission apparatus according to an embodiment of the present invention.
Figure 11B:
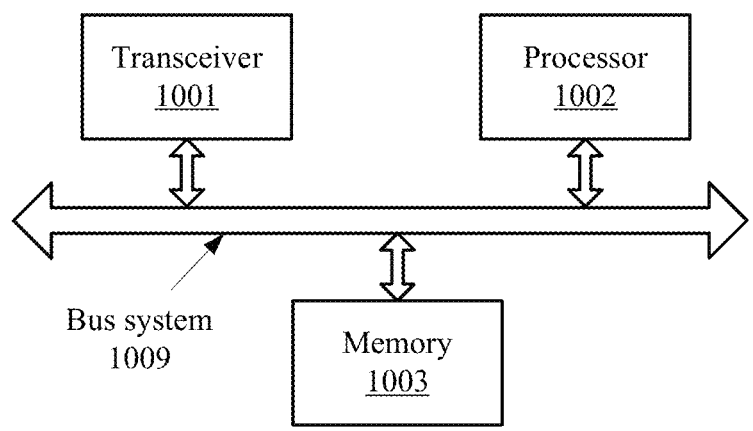
FIG. 11b is a schematic structural diagram of another control information transmission apparatus according to an embodiment of the present invention.

FIG. 11a and FIG. 11b are schematic structural diagrams of a control information transmission apparatus according to an embodiment of the present invention. The control information transmission apparatus in this embodiment of the present invention is applied to a network device, and may be more specifically a transmission/reception point, for example, a base station; or may be a device that can implement corresponding functions of the network device described in the foregoing methods. As shown in FIG. 11a, the apparatus may include a determining unit 101, a coding unit 102, and a mapping unit 103.

The determining unit 101 may be configured to perform a determining action performed by the network device described in the method in FIG. 3.

The coding unit 102 may be configured to perform a coding action performed by the network device described in the method in FIG. 3.

The mapping unit 103 may be configured to perform, on a codeword that is coded by the coding unit 102, corresponding processing described in the foregoing method.

The mapping unit 103 may be implemented by a transceiver 1001 in FIG. 11b. The determining unit 101 and the coding unit 102 may be implemented by a processor 1002, or the determining unit 101 and the coding unit 102 may be implemented by a processor 1002 and a memory 1003.

For specific details, refer to descriptions in the foregoing method. Details are not described herein again.

For example, the determining unit 101 is configured to determine N pieces of to-be-jointly-coded downlink control information DCI, where N is an integer greater than or equal to 2.

The coding unit 102 is configured to jointly code the N pieces of DCI in a polar coding manner, to obtain one codeword.

The mapping unit 103 is configured to map the codeword to a time-frequency resource of a downlink control channel for sending.

Optionally, that the coding unit 102 jointly codes the N pieces of DCI in the polar coding manner, to obtain one codeword specifically includes: cascading the N pieces of DCI in a preset order, and jointly coding the cascaded N pieces of DCI in the polar coding manner, to obtain one codeword.

Optionally, the preset order includes at least one of the following orders:

DCI of user equipment with a high priority ranks higher than DCI of user equipment with a low priority;

DCI of user equipment in a good channel condition ranks higher than DCI of user equipment in a poor channel condition; and DCI of latency-sensitive user equipment ranks higher than DCI of latency-insensitive user equipment.

Optionally, that the determining unit 101 determines the N pieces of to-be-jointly-coded downlink control information DCI specifically includes:

determining the N pieces of to-be-jointly-coded DCI according to a preset rule, where the preset rule includes at least one of the following rules:

user equipments of the N pieces of DCI are in same or similar channel conditions; and functions indicated by information carried in the N pieces of DCI are the same.

Optionally, a time-frequency resource of the downlink control channel in a time interval carries one codeword; or a time-frequency resource of the downlink control channel in one time interval carries M codewords, and user equipment of DCI included in any one of the M codewords is in same or similar channel conditions, where M is an integer greater than or equal to 2.

Correspondingly, as shown in FIG. 11b, the apparatus may include the transceiver 1001 and the processor 1002. The processor 1002 is configured to control an operation of the apparatus, including: performing time-frequency resource mapping (including receiving and/or sending) for DCI by using the transceiver 1001. Further, the apparatus may include the memory 1003, and the memory 1003 may include a read-only memory and a random access memory, and is configured to provide an instruction and data for the processor 1002. The memory 1003 may be integrated into the processor 1002, or may be independent of the processor 1002. A part of the memory 1003 may further include a non-volatile random access memory (NVRAM). Components of the apparatus are coupled together by using a bus system. In addition to a data bus, a bus system 1009 includes a power bus, a control bus, and a status signal bus. However, for clear description, various types of buses in the figure are marked as the bus system 1009.

A process disclosed on a network device side in FIG. 3 in the embodiments of this application may be applied to the processor 3002, or may be implemented by the processor 3002. In an implementation process, steps of a process implemented by the apparatus can be implemented by using a hardware integrated logical circuit in the processor 3002, or by using instructions in a form of software. The processor 3002 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1003, and the processor 1002 reads information in the memory 1003 and completes the steps in processes in the embodiments of the present invention in combination with hardware of the processor.

Optionally, the processor 1002 is configured to determine N pieces of to-be-jointly-coded downlink control information DCI, where N is an integer greater than or equal to 2.

The processor 1002 is further configured to jointly code the N pieces of DCI in a polar coding manner, to obtain one codeword.

The transceiver 1001 is configured to map the codeword to a time-frequency resource of a downlink control channel for sending.

Optionally, the processor 1002 is further configured to cascade the N pieces of DCI in a preset order, and jointly code the cascaded N pieces of DCI in the polar coding manner, to obtain one codeword.

Optionally, the preset order includes at least one of the following orders:

DCI of user equipment with a high priority ranks higher than DCI of user equipment with a low priority;

DCI of user equipment in a good channel condition ranks higher than DCI of user equipment in a poor channel condition; and DCI of latency-sensitive user equipment ranks higher than DCI of latency-insensitive user equipment.

Optionally, the processor 1002 is further configured to determine the N pieces of to-be-jointly-coded DCI according to a preset rule, where the preset rule includes at least one of the following rules:

user equipments of the N pieces of DCI are in same or similar channel conditions; and functions indicated by information carried in the N pieces of DCI are the same.

Optionally, a time-frequency resource of the downlink control channel in a time interval carries one codeword; or a time-frequency resource of the downlink control channel in one time interval carries M codewords, and user equipment of DCI included in any one of the M codewords is in same or similar channel conditions, where M is an integer greater than or equal to 2.

When the network device is a base station, the network device may further include a communications interface module, configured to communicate with another base station or network element, for example, a network element in a core network.

Based on a same technical conception, an embodiment of the present invention further provides a control information transmission apparatus. The apparatus may be the user equipment described in the foregoing methods, or may be another device that can implement actions of the user equipment in the foregoing methods.

Figure 12A:
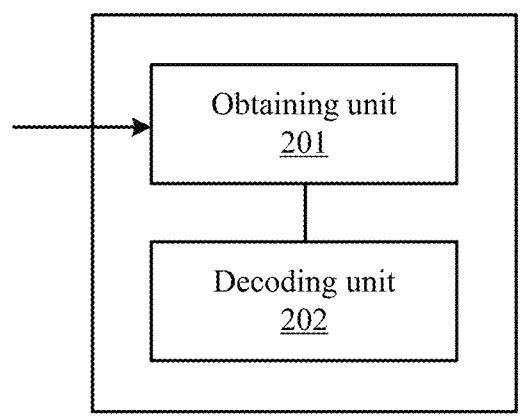
FIG. 12a is a schematic structural diagram of a control information transmission apparatus according to an embodiment of the present invention.
Figure 12B:
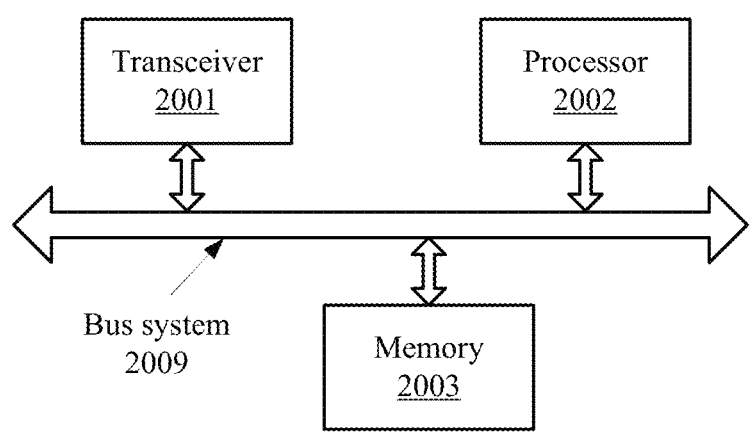
FIG. 12b is a schematic structural diagram of another control information transmission apparatus according to an embodiment of the present invention.

FIG. 12a and FIG. 12b are schematic structural diagrams of a control information transmission apparatus according to an embodiment of the present invention. As shown in FIG. 12a, the apparatus may include an obtaining unit 201 and a decoding unit 202.

The obtaining unit 201 may be configured to perform an obtaining action performed by the user equipment described in the method in FIG. 3.

The decoding unit 202 may be configured to perform a decoding action performed by the user equipment described in the method in FIG. 3.

The obtaining unit 201 may be implemented by a transceiver 2001 in FIG. 12b. The decoding unit 202 may be implemented by a processor 2001, or implemented by a processor 2002 and a memory 2003.

For specific details, refer to descriptions in the foregoing method. Details are not described herein again.

For example, the obtaining unit 201 is configured to: when information sent by a network device is received, obtain to-be-decoded information that includes DCI of the user equipment from the information, where the to-be-decoded information carries a codeword obtained by the network device by jointly coding N pieces of DCI in a polar coding manner, and N is an integer greater than or equal to 2.

The decoding unit 202 is configured to perform sequential polar code decoding on the to-be-decoded information, to obtain the DCI of the user equipment.

Optionally, the DCI of the user equipment includes a cyclic redundancy check CRC code formed by performing scrambling by using a preset identifier corresponding to the user equipment.

That the decoding unit 202 performs sequential polar code decoding on the to-be-decoded information, to obtain the DCI of the user equipment specifically includes:

performing sequential polar code decoding on the to-be-decoded information, and each time one piece of DCI is decoded, descrambling, by the user equipment, a CRC in the DCI by using the preset identifier corresponding to the user equipment; checking an information part of the DCI by using a descrambled CRC; and if the check succeeds, determining that the DCI is the DCI of the user equipment.

Optionally, the preset identifier corresponding to the user equipment includes a unique identifier pre-allocated to the user equipment, or a group identifier pre-allocated to a group in which the user equipment is located.

As shown in FIG. 12b, the control information transmission apparatus may include the transceiver 2001, the processor 2002, and the memory 2003.

The processor 2002 is configured to control an operation of the apparatus, including transmitting (including receiving and/or sending) data by using the transceiver 2001. The memory 2003 may include a read-only memory and a random access memory, and is configured to provide an instruction and data for the processor 2002. A part of the memory 2003 may further include a non-volatile random access memory (NVRAM). Components of the apparatus are coupled together by using a bus system. In addition to a data bus, a bus system 2009 includes a power bus, a control bus, and a status signal bus. However, for clear description, various types of buses in the figure are marked as the bus system 2009.

A process disclosed on a user equipment side in FIG. 3 in the embodiments of this application may be applied to the processor 2002, or may be implemented by the processor 2002. In an implementation process, steps of a process implemented by the apparatus can be implemented by using a hardware integrated logical circuit in the processor 2002, or by using instructions in a form of software. The processor 2002 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 2003, and the processor 2002 reads information in the memory 2003 and completes the steps in processes in the embodiments of the present invention in combination with hardware of the processor.

Optionally, the transceiver 2001 is configured to: when information sent by a network device is received, obtain to-be-decoded information that includes DCI of the user equipment from the information, where the to-be-decoded information carries a codeword obtained by the network device by jointly coding N pieces of DCI in a polar coding manner, and N is an integer greater than or equal to 2.

The processor 2002 is configured to perform sequential polar code decoding on the to-be-decoded information, to obtain the DCI of the user equipment.

Optionally, the DCI of the user equipment includes a cyclic redundancy check CRC code formed by performing scrambling by using a preset identifier corresponding to the user equipment.

The processor 2002 is further configured to: perform sequential polar code decoding on the to-be-decoded information, and each time one piece of DCI is decoded, descramble, by the user equipment, a CRC in the DCI by using the preset identifier corresponding to the user equipment; check an information part of the DCI by using a descrambled CRC; and if the check succeeds, determine that the DCI is the DCI of the user equipment.

Optionally, the preset identifier corresponding to the user equipment includes a unique identifier pre-allocated to the user equipment, or a group identifier pre-allocated to a group in which the user equipment is located.

Further, when the apparatus is user equipment, the apparatus may further include an input device such as a keyboard, an output device such as a display screen, and other structures. Details are not described herein.

An embodiment of this application further provides a system, including the foregoing apparatus configured to jointly coding a plurality of pieces of DCI and the foregoing apparatus configured to sequentially decode to-be-decoded information. The system may be a communications system or another system.

Figure 13A:
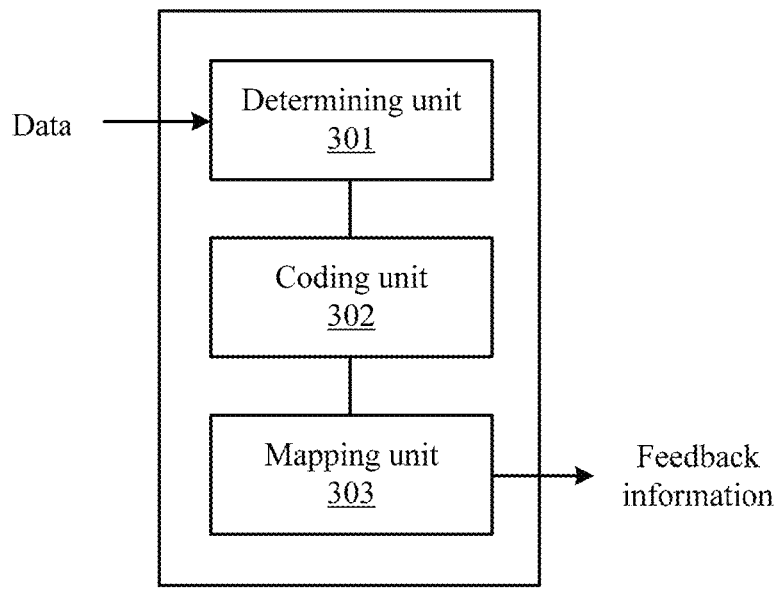
FIG. 13a is a schematic structural diagram of a feedback information transmission apparatus according to an embodiment of the present invention.
Figure 13B:
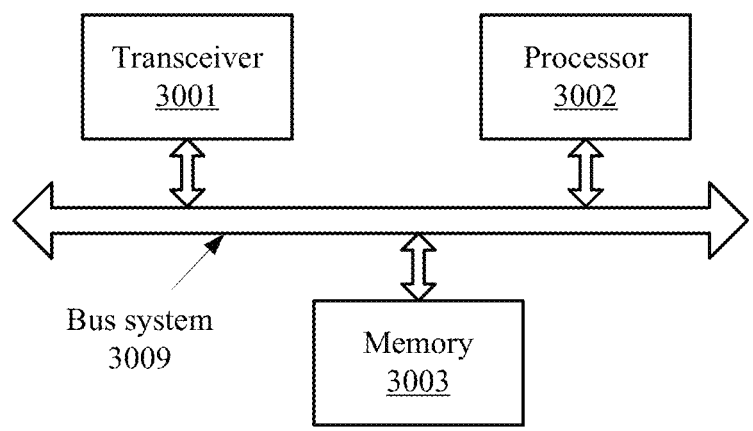
FIG. 13b is a schematic structural diagram of another feedback information transmission apparatus according to an embodiment of the present invention.

FIG. 13a and FIG. 13b are schematic structural diagrams of a feedback information transmission apparatus according to an embodiment of the present invention. The feedback information transmission apparatus in this embodiment of the present invention is applied to a first device, and the first device may be a network device, and more specifically, may be a transmission/reception pint, for example, a base station. The first device may alternatively be user equipment. When the first device is a network device, the second device is user equipment. When the first device is user equipment, the second device is a network device.

As shown in FIG. 13a, the apparatus may include a determining unit 301, a coding unit 302, and a mapping unit 303.

The determining unit 301 may be configured to perform a determining action performed by the first device described in the method in FIG. 8.

The coding unit 302 may be configured to perform a coding action performed by the first device described in the method in FIG. 8.

The mapping unit 303 may be configured to perform, on a codeword that is coded by the coding unit 302, corresponding processing performed by the first device described in the method in FIG. 8.

The mapping unit 303 may be implemented by a transceiver 3001 in FIG. 13b. The determining unit 301 and the coding unit 302 may be implemented by a processor 3002, or the determining unit 301 and the coding unit 302 may be implemented by a processor 3002 and a memory 3003.

For specific details, refer to descriptions in the foregoing method. Details are not described herein again.

For example, the determining unit 301 is configured to determine Q pieces of feedback information, where the Q pieces of feedback information are feedbacks for received data carried by P data transmission units, Q is an integer greater than or equal to 2, P is greater than or equal to Q, and P is an integer.

The coding unit 302 is configured to jointly code the Q pieces of feedback information in a polar coding manner, to obtain one codeword.

The mapping unit 303 is configured to map the codeword to a corresponding time-frequency resource for sending.

Optionally, if the first device is a network device, the data carried by the P data transmission units is data sent by at least one user equipment to the network device, and the at least one user equipment is in same channel conditions.

If the first device is user equipment, the data carried by the P data transmission units is data sent by a network device to the user equipment.

Optionally, that the coding unit 302 jointly codes the Q pieces of feedback information in the polar coding manner, to obtain one codeword specifically includes: dividing the Q pieces of feedback information into R information segments by using K pieces of feedback information as a basic unit, where K is an integer greater than or equal to 2, and K×R is greater than or equal to Q; and adding a CRC after each information segment, and jointly coding R information segments to which the CRC is added, to obtain one codeword.

Optionally, the data transmission unit includes a code block CB, and one piece of feedback information corresponds to at least one CB; or the data transmission unit includes a component carrier CC, and one piece of feedback information corresponds to one CC.

Correspondingly, as shown in FIG. 13b, the apparatus may include the transceiver 3001 and the processor 3002. The processor 3002 is configured to control an operation of the apparatus, including: performing time-frequency resource mapping (including receiving and/or sending) for feedback information by using the transceiver 3001. Further, the apparatus may include the memory 3003, and the memory 3003 may include a read-only memory and a random access memory, and is configured to provide an instruction and data for the processor 3002. The memory 3003 may be integrated into the processor 3002, or may be independent of the processor 3002. A part of the memory 3003 may further include a non-volatile random access memory (NVRAM). Components of the apparatus are coupled together by using a bus system. In addition to a data bus, a bus system 3009 includes a power bus, a control bus, and a status signal bus. However, for clear description, various types of buses in the figure are marked as the bus system 3009.

A process disclosed on a first device side in FIG. 8 in the embodiments of this application may be applied to the processor 3002, or may be implemented by the processor 3002. In an implementation process, steps of a process implemented by the apparatus can be implemented by using a hardware integrated logical circuit in the processor 3002, or by using instructions in a form of software. The processor 3002 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 3003, and the processor 3002 reads information in the memory 3003 and completes the steps in processes in the embodiments of the present invention in combination with hardware of the processor.

Optionally, the processor 3002 is configured to determine Q pieces of feedback information, where the Q pieces of feedback information are feedbacks for received data carried by P data transmission units, Q is an integer greater than or equal to 2, P is greater than or equal to Q, and P is an integer.

The processor 3002 is further configured to jointly code the Q pieces of feedback information in a polar coding manner, to obtain one codeword.

The transceiver 3001 is configured to map the codeword to a corresponding time-frequency resource for sending.

Optionally, if the first device is a network device, the data carried by the P data transmission units is data sent by at least one user equipment to the network device, and the at least one user equipment is in same channel conditions.

If the first device is user equipment, the data carried by the P data transmission units is data sent by a network device to the user equipment.

Optionally, the processor 3002 is further configured to: divide the Q pieces of feedback information into R information segments by using K pieces of feedback information as a basic unit, where K is an integer greater than or equal to 2, and K×R is greater than or equal to Q; and add a CRC after each information segment, and jointly code R information segments to which the CRC is added, to obtain one codeword.

Optionally, the data transmission unit includes a code block CB, and one piece of feedback information corresponds to at least one CB; or the data transmission unit includes a component carrier CC, and one piece of feedback information corresponds to one CC.

When the apparatus is a base station, the network device may further include a communications interface module, configured to communicate with another base station or network element, for example, a network element in a core network.

When the apparatus is user equipment, the apparatus may further include an input device such as a keyboard, an output device such as a display screen, and other structures.

Based on a same technical conception, an embodiment of the present invention further provides a feedback information transmission apparatus. The apparatus may be the second device described in the foregoing methods, or may be another device that can implement actions of the second device in the foregoing methods. The second device may be a network device, and more specifically, may be a transmission/reception point, for example, a base station. The second device may alternatively be user equipment. When the second device is a network device, the first device is user equipment. When the second device is user equipment, the first device is a network device.

Figure 14A:
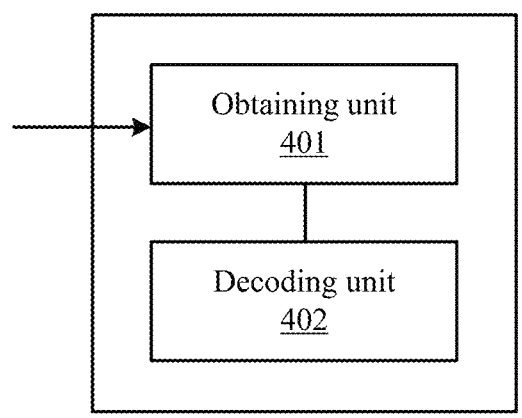
FIG. 14a is a schematic structural diagram of a feedback information transmission apparatus according to an embodiment of the present invention.
Figure 14B:
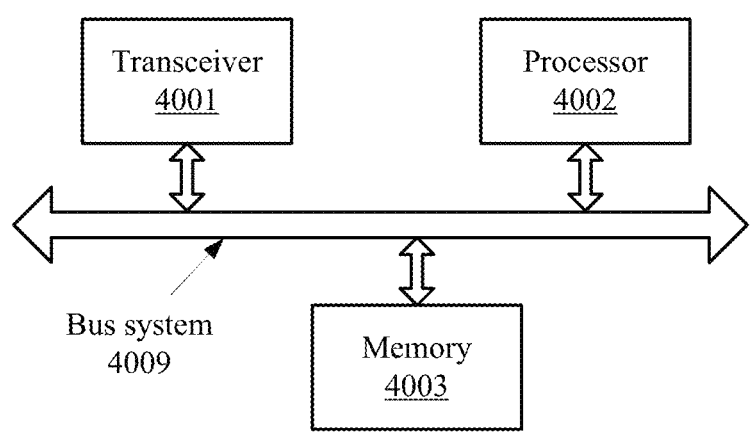
FIG. 14b is a schematic structural diagram of another feedback information transmission apparatus according to an embodiment of the present invention.

FIG. 14a and FIG. 14b are schematic structural diagrams of a feedback information transmission apparatus according to an embodiment of the present invention. As shown in FIG. 14a, the apparatus may include an obtaining unit 401 and a decoding unit 402.

The obtaining unit 401 may be configured to perform an obtaining action performed by the second device described in the method in FIG. 8.

The decoding unit 402 may be configured to perform a decoding action performed by the second device described in the method in FIG. 8.

The obtaining unit 401 may be implemented by a transceiver 4001 in FIG. 14b. The decoding unit 402 may be implemented by a processor 4002, or implemented by a processor 4002 and a memory 4003.

For specific details, refer to descriptions in the foregoing method. Details are not described herein again.

For example, the obtaining unit 401 is configured to: when information fed back by a first device is received, obtain to-be-decoded information from the information, where the to-be-decoded information carries a codeword obtained by the first device by jointly coding Q pieces of feedback information in a polar coding manner, and Q is an integer greater than or equal to 2.

The decoding unit 402 is configured to perform sequential polar code decoding on the to-be-decoded information, to obtain the Q pieces of feedback information.

Optionally, the codeword includes R information segments, the R information segments are obtained by dividing the Q pieces of feedback information by using K pieces of feedback information as a basic unit, and each information segment includes one CRC.

That the decoding unit 402 performs sequential polar code decoding on the to-be-decoded information specifically includes:

performing sequential polar code decoding on the to-be-decoded information in a form of consecutive information segments, and each time one information segment is decoded, checking the information segment by using a CRC of the information segment.

As shown in FIG. 14b, the feedback information transmission apparatus may include the transceiver 4001, the processor 4002, and the memory 4003.

The processor 4002 is configured to control an operation of the apparatus, including transmitting (including receiving and/or sending) data by using the transceiver 4001. The memory 4003 may include a read-only memory and a random access memory, and is configured to provide an instruction and data for the processor 4002. A part of the memory 4003 may further include a non-volatile random access memory (NVRAM). Components of the apparatus are coupled together by using a bus system. In addition to a data bus, a bus system 4009 includes a power bus, a control bus, and a status signal bus. However, for clear description, various types of buses in the figure are marked as the bus system 4009.

A process disclosed on a second device side in FIG. 8 in the embodiments of this application may be applied to the processor 4002, or may be implemented by the processor

4002. In an implementation process, steps of a process implemented by the apparatus can be implemented by using a hardware integrated logical circuit in the processor 4002, or by using instructions in a form of software. The processor 4002 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 4003, and the processor 4002 reads information in the memory 4003 and completes the steps in processes in the embodiments of the present invention in combination with hardware of the processor.

Optionally, the transceiver 4001 is configured to: when information fed back by a first device is received, obtain to-be-decoded information from the information, where the to-be-decoded information carries a codeword obtained by the first device by jointly coding Q pieces of feedback information in a polar coding manner, and Q is an integer greater than or equal to 2.

The processor 4002 is configured to perform sequential polar code decoding on the to-be-decoded information, to obtain the Q pieces of feedback information.

Optionally, the codeword includes R information segments, the R information segments are obtained by dividing the Q pieces of feedback information by using K pieces of feedback information as a basic unit, and each information segment includes one CRC.

The processor 4002 is further configured to: perform sequential polar code decoding on the to-be-decoded information in a form of consecutive information segments, and each time one information segment is decoded, check the information segment by using a CRC of the information segment.

Further, when the apparatus is user equipment, the apparatus may further include an input device such as a keyboard, an output device such as a display screen, and other structures. Details are not described herein.

When the apparatus is a base station, the apparatus may further include a communications interface module, configured to communicate with another base station or network element, for example, a network element in a core network.

An embodiment of this application further provides a system, including the foregoing apparatus configured to jointly coding a plurality of pieces of feedback information and the foregoing apparatus configured to sequentially decode to-be-decoded information. The system may be a communications system or another system.

It should be understood that "one embodiment" or "an embodiment" mentioned in the entire specification does not mean that particular features, structures, or characteristics related to the embodiment are included in at least one embodiment of the present invention. Therefore, "in one embodiment" or "in an embodiment" appearing throughout the specification does not necessarily mean a same embodiment. In addition, these particular features, structures, or characteristics may be combined in one or more embodiments in any appropriate manner. Sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should further be understood that determining B based on A does not mean that B is determined based on A only, and B may also be determined based on A and/or other information. In the embodiments of this application, "at least one of A, B, and C" represents selecting at least one from a set (A, B, and C), for example, A; B; C; A and B; A and C; B and C; or A, B, and C. Descriptions such as "a first A" and "a second A" in the embodiments of this application are merely used to distinguish between a plurality of As, and are not used to represent other meanings.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through indirect couplings or communication connections between some transceivers, apparatuses, or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of the present invention.

In addition, functional units in the embodiments of the present invention may be integrated into one processor, or each of the units may exist alone physically, or two or more units are integrated into one unit. The integrated unit may be implemented in a form of hardware, or may be implemented in a form of a software functional unit.

By using descriptions of the foregoing embodiments, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital STA line (DSL) or wireless technologies such as infrared ray, radio and microwave, the coaxial cable, optical fiber/cable, twisted pair, DSL or wireless technologies such as infrared ray, and radio and microwave are included in fixation of a medium to which they belong. For example, a disk (Disk) and a disc (disc) used in the present invention include a compact disc (CD), a laser disc, an optical disc, a digital versatile disc (DVD), a floppy disk and a Blu-ray disc, and the disk generally copies data by using a magnetic means, and the disc copies data optically by using a laser means. The foregoing combination should also be included in the protection scope of the computer-readable medium.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a disk memory, a CD-ROM, an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device, so that the instructions executed by the computer or the processor of any other programmable data processing device may implement a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

The invention claimed is:

1. A method for transmitting control information, comprising:
   determining N downlink control information (DCI) to be jointly encoded according to a rule, wherein N is an integer greater than or equal to 2, and the rule comprises specifics one of the following:
      a plurality of user equipment of the N DCIs are in same or similar channel conditions; or
      functions indicated by information carried in the N of DCIs are the same;
   cascading the N DCIs in an order, wherein the order comprises at least one of the following:
      a good user equipment channel condition DCI ranks higher than a poor user equipment channel condition DCI; and
      latency-sensitive user equipment DCI ranks higher than latency-insensitive user equipment DCI;
   polar encoding the cascaded N DCIs to obtain a codeword;
   mapping the codeword to a time-frequency resource of a downlink control channel for transmitting; and
   transmitting the codeword, wherein the codeword further includes an information part of the user equipment DCI that when found by the user equipment causes the user equipment to exit decoding of the polar encoded DCI.

2. The method according to claim 1, wherein each of the N DCI comprises a cyclic redundancy check (CRC), and the CRC is formed by performing scrambling in an identifier corresponding to a user equipment of the DCI.

3. The method according to claim 1, wherein a time-frequency resource of the downlink control channel in one time interval carries one codeword; or a time-frequency resource of the downlink control channel in one time interval carries M codewords, and user equipment of DCI comprised in any one of the M codewords is in same or similar channel conditions, wherein M is an integer greater than or equal to 2.

4. A method for transmitting control information, comprising:
obtaining, to-be-decoded information that comprises downlink control information (DCI) of user equipment, wherein the to-be-decoded information carries a codeword jointly coding N DCIs in a polar encoding according to a rule, wherein N is an integer greater than or equal to 2, and the rule specifies one of the following:
a plurality of user equipment of the N DCIs are in same or similar channel conditions; or
functions indicated by information carried in the N of the DCIs are the same; and
the N DCIs are cascaded in an order, wherein the order comprises at least one of the following:
a good user equipment channel condition DCI ranks higher than a poor user equipment channel condition DCI; and
latency-sensitive user equipment DCI ranks higher than latency-insensitive user equipment DCI;
sequentially polar decoding the to-be-decoded information, to obtain the DCI of the user equipment;
determining a user equipment identifier of the to-be-decoded information;
exiting the sequential polar decoding, responsive to determining the user equipment identifier of the to-be-decoded information, before completion of the sequential polar decoding; and
performing, responsive to exiting the sequential polar decoding, a next operation according to an instruction in the DCI.

5. The method according to claim 4, wherein the DCI of the user equipment comprises a cyclic redundancy check (CRC) formed by performing scrambling on an identifier corresponding to the user equipment corresponding to the DCI; and, wherein
sequentially polar decoding the to-be-decoded information to obtain the DCI of the user equipment comprises:
when one DCI is decoded, descrambling a CRC in the DCI by using the identifier corresponding to the user equipment;
checking, by the user equipment, an information part of the DCI by using the descrambled CRC; and
responsive to the check succeeding, determining that the DCI is the DCI of the user equipment.

6. The method according to claim 5, wherein the preset identifier corresponding to the user equipment comprises a unique identifier pre-allocated to the user equipment, or a group identifier pre-allocated to a group in which the user equipment is located.

7. A method for transmitting feedback information, comprising:
determining Q feedback information, wherein the Q feedback information are feedbacks for received data carried by P data transmission units, Q is an integer greater than or equal to 2, P is greater than or equal to Q, and P is an integer;
polar encoding the Q feedback information to obtain a codeword; and mapping the codeword to a corresponding time-frequency resource for transmission; and, wherein
responsive to a first device being a network device, the data carried by the P data transmission units is data sent by at least one user equipment to the network device, and the at least one user equipment is in same or similar channel conditions; or
responsive to the first device being user equipment, the data carried by the P data transmission units is data sent by a network device to the user equipment; and
mapping the codeword to a time-frequency resource of a downlink control channel for transmitting; and
transmitting the codeword, wherein the codeword further includes an information part of the user equipment DCI that when found by the user equipment causes the user equipment to exit decoding of the polar encoding.

8. The method according to claim 7, wherein the coding the Q feedback information in the polar coding manner, to obtain the codeword comprises:
dividing the Q feedback information into R information segments by using K feedback information as a basic unit, wherein K is an integer greater than or equal to 2, and K×R is greater than or equal to Q; and
adding, by the first device, a CRC after each information segment, and jointly coding R information segments to which the CRC is added, to obtain one codeword.

9. The method according to claim 7, wherein the data transmission unit comprises a code block (CB), and one piece of feedback information corresponds to at least one CB; or
the data transmission unit comprises a component carrier (CC), and one feedback information corresponds to one CC.

10. A method for transmitting feedback information, comprising:
obtaining, to-be-decoded information, wherein the to-be-decoded information carries a codeword by jointly coding Q feedback information in a polar encoding, wherein Q is an integer greater than or equal to 2; and
sequentially polar decoding the to-be-decoded information to obtain the Q feedback information;
sending, responsive to a first device being a network device, data carried by P data transmission units by at least one user equipment to the network device, and the at least one user equipment is in same or similar channel conditions; or
sending, responsive to the first device being user equipment, the data carried by the P data transmission units by a network device to the user equipment;
mapping the codeword to a time-frequency resource of a downlink control channel for transmitting; and
transmitting the codeword, wherein the codeword further includes an information part of the user equipment DCI that when found by the user equipment causes the user equipment to exit decoding of the polar encoding.

11. The method according to claim 10, wherein the codeword comprises R information segments, the R information segments are obtained by dividing the Q feedback information by using K feedback information as a basic unit, and each information segment comprises one CRC; and sequentially polar decoding on the to-be-decoded information, to obtain the Q feedback information comprises:
sequentially polar decoding, by the second device, the to-be-decoded information in a form of consecutive information segments, and when one information segment is decoded, checking, the information segment by using a CRC of the information segment.

12. An apparatus for transmitting control information comprising:
memory; and
a processor configured to execute a machine-readable instruction stored in the memory to cause the processor to:
determine N downlink control information (DCI) to be jointly encoded according to a rule, wherein N is an integer greater than or equal to 2, and the rule specifies one of the following:
user equipments of the N DCIs are in same or similar channel conditions;
or
functions indicated by information carried in the N of DCIs are the same;
polar encode the N DCIs to obtain a codeword, wherein polar encoding the N DCIs to obtain the codeword includes:
cascading the N DCIs in an order, wherein the order includes at least one of the following orders:
DCI of user equipment in a good channel condition ranks higher than DCI of user equipment in a poor channel condition; and
DCI of latency-sensitive user equipment ranks higher than DCI of latency-insensitive user equipment;
map the codeword to a time-frequency resource of a downlink control channel for transmitting;
identify a user equipment identifier of the DCI during decoding;
exit the decoding before completion based on identifying the user equipment identifier; and
perform a next operation.

13. The apparatus according to claim 12, wherein each of the N DCI comprises a cyclic redundancy check (CRC), and the CRC is formed by performing scrambling in an identifier corresponding to a user equipment of the DCI.

* * * * *